US012739212B1

(12) United States Patent
Agrawal

(10) Patent No.: US 12,739,212 B1
(45) Date of Patent: Sep. 15, 2026

(54) ONLINE SOFTWARE PLATFORM (OSP) PRESENTLY ENABLING FUTURE RESOURCE PRODUCTION (FUTREP) ACCORDING TO PRESENTLY UNSPECIFIED DIGITAL RULES

(71) Applicant: Avalara, Inc., Seattle, WA (US)

(72) Inventor: Naveen Kumar Agrawal, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 751 days.

(21) Appl. No.: 17/188,763

(22) Filed: Mar. 1, 2021

Related U.S. Application Data

(60) Provisional application No. 62/985,707, filed on Mar. 5, 2020.

(51) Int. Cl.
*H04L 47/70* (2022.01)
*G06F 16/2455* (2019.01)

(52) U.S. Cl.
CPC ........ *H04L 47/82* (2013.01); *G06F 16/24564* (2019.01)

(58) Field of Classification Search
None
See application file for complete search history.

(56) References Cited

U.S. PATENT DOCUMENTS 7,783,536 B2 8/2010 William et al.
7,933,803 B1 4/2011 Nadler et al.
8,620,578 B1 12/2013 Brown et al.
8,725,407 B2 5/2014 Hurley et al.
9,760,915 B2 9/2017 Pavlou et al.
10,445,818 B1 10/2019 Chowdhary
10,769,611 B2 9/2020 McNeel
2002/0138765 A1 9/2002 Fishman et al.
2007/0136158 A1 6/2007 Rawlings et al.
2007/0136159 A1 6/2007 Rawlings et al.
2010/0005080 A1* 1/2010 Pike .................... G06F 16/2471 707/E17.002
2013/0013471 A1 1/2013 Fishman
2016/0098654 A1* 4/2016 Bhattacharjee .. G06Q 10/06395 705/7.36
2020/0026591 A1* 1/2020 Agarwal ................ G06F 11/34

* cited by examiner

*Primary Examiner* — John A Follansbee
*Assistant Examiner* — Christopher P Cadorna
(74) *Attorney, Agent, or Firm* — Jeremiah J. Baunach; Frontier IP Law PLLC

(57) ABSTRACT

An online software platform (OSP) enables future resource production (FUTREP) for clients according to presently unspecified digital rules. In particular, the OSP enables a client to additionally have the OSP produce one or more additional resources according to such future digital rules for a dataset of the client representing a relationship instance of the client. Based on options selectable by the client, future digital rules that may not be in existence, not yet applicable, not yet accessible, are otherwise not yet specified and/or have not yet been stored by an the OSP may be automatically applied to datasets of clients, avoiding the client and OSP having to request such future digital rules to be applied each time they are saved or updated by the OSP, and avoiding the client and the OSP having to go back and revise previously produced resources based on future digital rules.

10 Claims, 14 Drawing Sheets

Figure 6:
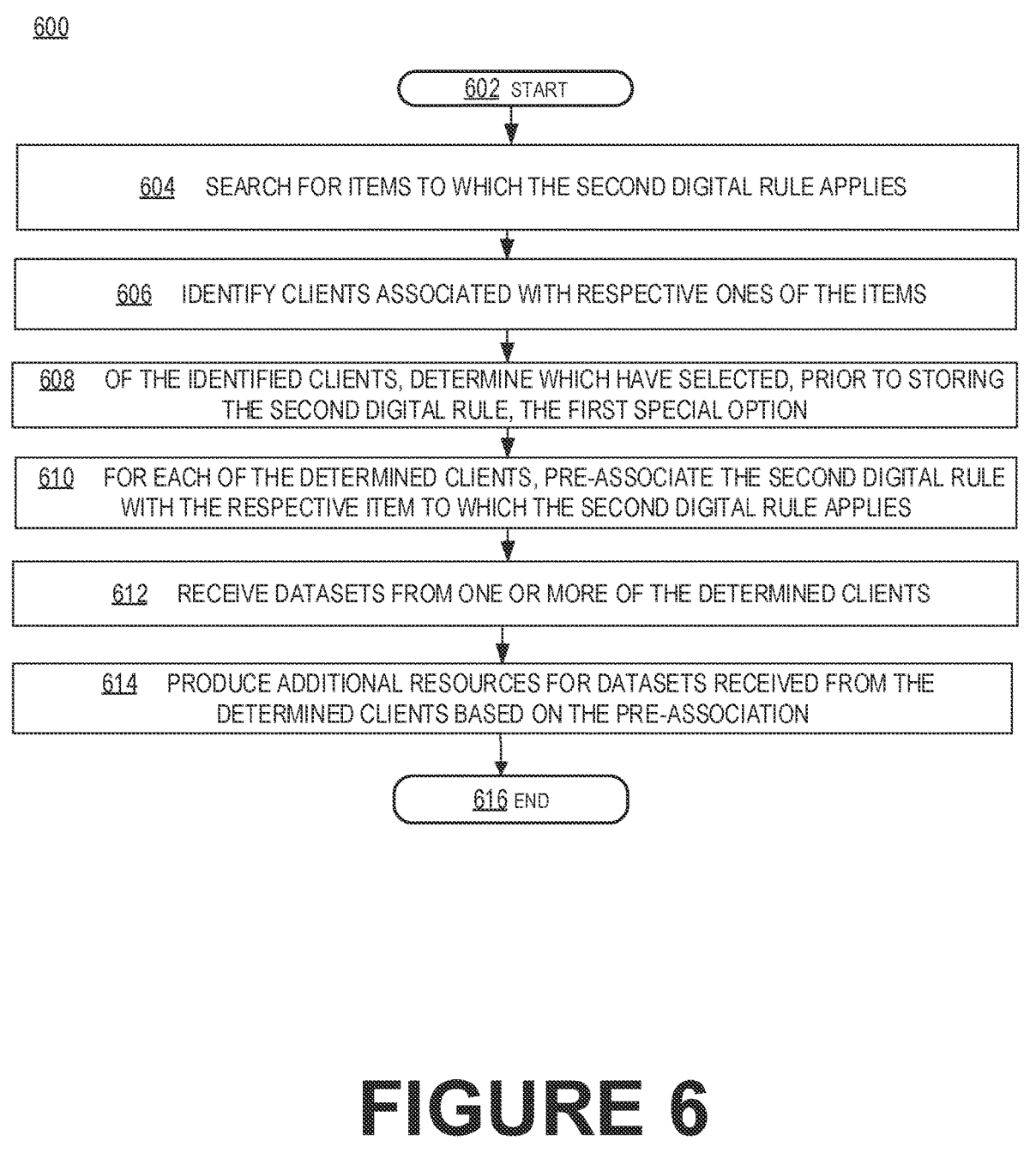

600

602 START

604 SEARCH FOR ITEMS TO WHICH THE SECOND DIGITAL RULE APPLIES

606 IDENTIFY CLIENTS ASSOCIATED WITH RESPECTIVE ONES OF THE ITEMS

608 OF THE IDENTIFIED CLIENTS, DETERMINE WHICH HAVE SELECTED, PRIOR TO STORING THE SECOND DIGITAL RULE, THE FIRST SPECIAL OPTION

610 FOR EACH OF THE DETERMINED CLIENTS, PRE-ASSOCIATE THE SECOND DIGITAL RULE WITH THE RESPECTIVE ITEM TO WHICH THE SECOND DIGITAL RULE APPLIES

612 RECEIVE DATASETS FROM ONE OR MORE OF THE DETERMINED CLIENTS

614 PRODUCE ADDITIONAL RESOURCES FOR DATASETS RECEIVED FROM THE DETERMINED CLIENTS BASED ON THE PRE-ASSOCIATION

616 END

ONLINE SOFTWARE PLATFORM (OSP) PRESENTLY ENABLING FUTURE RESOURCE PRODUCTION (FUTREP) ACCORDING TO PRESENTLY UNSPECIFIED DIGITAL RULES

TECHNICAL FIELD

The technical field relates to computer networks, and particularly to networked automated systems for an online software platform (OSP) to presently enable future resource production (FUTREP) according to presently unspecified digital rules.

BRIEF SUMMARY

The present description gives instances of computer systems, devices and storage media that may store programs and methods. When a client requests service of a service provider (SP) that operates an online software platform (OSP), the client and/or the SP are not aware of future digital rules that may not be in existence, not yet applicable, not yet accessible, are otherwise not yet specified. Therefore, such digital rules typically have not yet been stored by the OSP. Thus, in various embodiments disclosed herein, the OSP enables FUTREP for clients according to presently unspecified digital rules. In particular, the OSP enables a client to additionally have the OSP produce one or more additional resources according to such future digital rules for a dataset of the client representing a relationship instance of the client. For example, the OSP may initially receive a settings request from a client for an electronic service of producing one or more resources for a dataset that the client will provide subsequently to the OSP according to one or more first digital rules of digital rules presently stored by the OSP. The OSP may also provide a first selectable special option to the client to additionally have the OSP produce one or more additional resources for the dataset according to a future digital rule not yet stored in memory. The OSP may receive input, such as a special option selection, indicating whether or not the client has selected the special option. In some embodiments, the special option selection is received before the dataset. In various embodiments, the special option selection may be received by the OSP during or after the initial onboarding or subscription of the client to the services of the OSP.

The OSP then further produces an additional resource based on applying the second digital rule, recognized as the future digital rule, to the dataset to produce a resource component. To produce the additional resource, the OSP adds the resource component to a first resource produced by applying one or more first digital rules. The OSP then transmits a response to the client regarding the additional resource. However, if the special option selection has not been received, then the OSP does not produce the additional resource and instead transmits a response to the client regarding the first resource.

In this manner, future digital rules that may not be in existence, not yet applicable, not yet accessible, are otherwise not yet specified and/or have not yet been stored by the OSP may be automatically applied to datasets of clients, avoiding the client and OSP having to request such future digital rules to be applied each time they are saved or updated by the OSP, and avoiding the client and OSP having to go back and revise previously produced resources based on future digital rules. This improves computerized networks by more efficiently using computing and network resources to increase the accuracy and speed of the networked computing system.

Therefore, the systems and methods described herein for the OSP presently enabling future resource production according to presently unspecified digital rules improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

As shown above and in more detail throughout the present disclosure, the present disclosure provides technical improvements in computer networks to existing computerized systems to facilitate estimation of resources.

These and other features and advantages of the claimed invention will become more readily apparent in view of the embodiments described and illustrated in this specification, namely in this written specification and the associated drawings.

BRIEF DESCRIPTION OF THE SEVERAL VIEWS OF THE DRAWINGS

The components in the drawings are not necessarily drawn to scale relative to each other. Like reference numerals designate corresponding parts throughout the several views.

FIG. 6 is a flowchart for illustrating a sample method in which FUTREP is enabled involving pre-association of digital rules with respective items to which the digital rules apply, according to embodiments of the present disclosure, which is an improvement in automated computerized systems.

FIG. 12 is a sample view of a User Interface (UI) of a system in which FUTREP has been enabled and a notification is presented accordingly to a client regarding applicability to a transaction of a new type of tax that has been enacted based on selections of the client for previously unknown taxes, according to embodiments of the present disclosure, which is an improvement in automated computerized systems.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Figure 1:
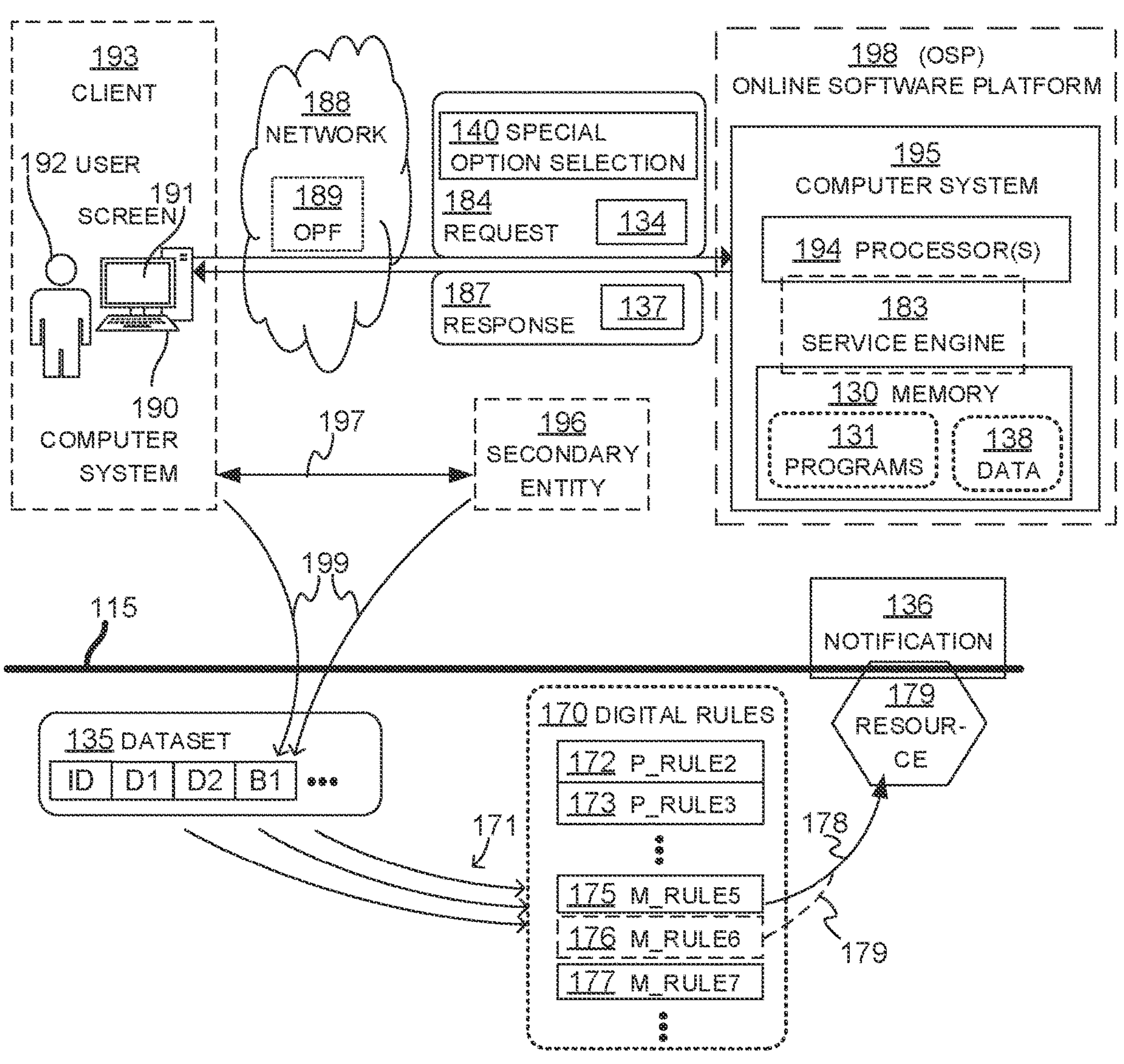
FIG. 1 is a diagram showing sample aspects of embodiments of the present disclosure involving receiving input indicating a client has selected a special option to enable future resource production (FUTREP) according to presently unspecified digital rules, according to embodiments of the present disclosure, which is an improvement in automated computerized systems.

FIG. 1 is a diagram showing sample aspects of embodiments of the present disclosure involving receiving input indicating a client has selected a special option to enable future resource production (FUTREP) according to presently unspecified digital rules, according to embodiments of the present disclosure, which is an improvement in automated computerized systems.

A thick line 115 separates this diagram, although not completely or rigorously, into a top portion and a bottom portion. Above the line 115 the emphasis is mostly on entities, components, their relationships, and their interactions, while below the line 115 emphasis is mostly on processing of data that takes place often within one or more of the components above the line 115.

Above the line 115, the sample computer system 195, network 188, client computer system 190 and secondary entity 196 according to embodiments is shown. The computer system 195 has one or more processors 194 and a memory 130. The memory 130 stores programs 131 and data 138. The one or more processors 194 and the memory 130 of the computer system 195 thus implement a service engine 183. Additional implementation details for the computer system 195 are given later in this document.

The computer system 195 can be located in "the cloud." In fact, the computer system 195 may optionally be implemented as part of an online software platform (OSP) 198. The OSP 198 can be configured to perform one or more predefined services, for example, via operations of the service engine 183. Such services can be, but are not limited to: producing respective resources by applying digital rules to respective datasets received by clients, such as client 193; causing notifications to be transmitted to clients about aspects of produced resources; and so on, including what is described in this document. Such services can be provided as a Software as a Service (SaaS).

A user 192 may be standalone. The user 192 may use a computer system 190 that has a screen 191, on which User Interfaces (UIs) may be shown. Additional sample implementation details for the computer system 190 are given later in this document. In embodiments, the user 192 and the computer system 190 are considered part of a primary entity, such as client 193, which can be referred to also merely as entity. In such instances, the user 192 can be an agent of the entity 193, and even within a physical site of the entity 193, although that is not necessary. In embodiments, the computer system 190 or other device of the user 192 or the entity 193 are client devices for the computer system 195.

The computer system 190 may access the computer system 195 via a communication network 188, such as the internet. In particular, the entities and associated systems of FIG. 1 may communicate via physical and logical channels of the communication network 188. For example, information may be communicated as data using the Internet Protocol (IP) suite over a packet-switched network such as the Internet or other packet-switched network, which may be included as part of the communication network 188. The communication network 188 may include many different types of computer networks and communication media including those utilized by various different physical and logical channels of communication, now known or later developed. Non-limiting media and communication channel examples include one or more, or any operable combination of: fiber optic systems, satellite systems, cable systems, microwave systems, asynchronous transfer mode ("ATM")

systems, frame relay systems, digital subscriber line ("DSL") systems, radio frequency ("RF") systems, telephone systems, cellular systems, other wireless systems, and the Internet. In various embodiments the communication network 188 can be or include any type of network, such as a local area network (LAN), a metropolitan area network (MAN), a wide area network (WAN), or the internet.

Downloading or uploading may be permitted from one of these two computer systems to the other, and so on. Such accessing can be performed, for instance, with manually uploading files, like spreadsheet files, etc. Such accessing can also be performed automatically as shown in the example of FIG. 1. The computer system 190 and the computer system 195 may exchange requests and responses with each other. Such can be implemented with a number of architectures.

In one such architecture, a device remote to the service engine 183, such as computer system 190, may have a certain application (not shown) and a connector (not shown) that is a plugin that sits on top of that certain application. The connector may be able to fetch from the remote device the details required for the service desired from the OSP 198, form an object or payload 134, and then send or push a request 184 that carries the payload 134 to the service engine 183 via a service call. The service engine 183 may receive the request 184 with the payload 134. The service engine 183 may then apply digital rules 170 to the payload 134 to determine a requested resource 179, form a payload 137 that is an aspect of the resource 179, and then push, send, or otherwise cause to be transmitted a response 187 that carries the payload 137 to the connector. The connector reads the response 187 and forwards the payload 137 to the certain application. In some embodiments, the OSP 198 may generate and deliver a software development kit (SDK) (not shown) including libraries, documentation, code samples, processes, and guides that the client 193 can use and integrate with the connector and other applications of the computer system 190 to implement functionality described herein. The SDK may be a collection of software development tools in one package installable by the client computer system 190. The SDK may facilitate the creation of applications by having a compiler, debugger and a software framework. The SDK may include libraries, documentation, code samples, processes, and guides that the client 193 can use and integrate with the connector and other applications of the computer system 190 to implement the functionality described herein. In various embodiments, the connector may have been built by the client 193, the OSP 198 or another entity. The client 193 may use the SDK for controlling the developing and adjusting, from the client-side, operations of the connector.

In an alternative such architecture, a device remote to the service engine 183, such as computer system 190, may have a particular application (not shown). In addition, the computer system 195 may implement a REST (Representational State Transfer) API (Application Programming Interface) (not shown). REST or RESTful API design is designed to take advantage of existing protocols. While REST can be used over nearly any protocol, it usually takes advantage of HTTP (Hyper Text Transfer Protocol) when used for Web APIs. This alternative architecture enables the client 193 to directly consume a REST API from their particular application, without using a connector. The particular application of the remote device may be able to fetch internally from the remote device the details required for the service desired from the OSP 198, and thus send or push the request 184 to the REST API. In turn, the REST API talks in background to the service engine 183. Again, the service engine 183 determines the requested resource 179, and sends an aspect of it back to the REST API. In turn, the REST API sends the response 187 that has the payload 137 to the particular application.

Moreover, in some embodiments, data from the computer system 190 and/or from the computer system 195 may be stored in an Online Processing Facility (OPF) 189 that can run software applications, perform operations, and so on. In such embodiments, requests and responses may be exchanged with the OPF 189, downloading or uploading may involve the OPF 189, and so on. In such embodiments, the computer system 190 and any devices of the OPF 189 can be considered to be remote devices, at least from the perspective of the computer system 195.

In some instances, the user 192 or the client 193 may have instances of relationships with secondary entities. Only one such secondary entity 196 is shown. However, additional secondary entities may be present in various other embodiments. For example, the client 193 has a relationship instance 197 with the secondary entity 196 via an intermediary entity (not shown).

In some instances, the user 192 and the client 193 may have data about one or more secondary entities, for example via relationship instances of the user 192 or primary entity with the secondary entity 196. The client 193, an intermediary entity and/or the secondary entity 196 may be referred to as simply entities. One of these entities may have one or more attributes. Such an attribute of such an entity may be any one of its name, type of entity, a physical or geographical location such as an address, a contact information element, an affiliation, a characterization of another entity, a characterization by another entity, an association or relationship with another entity (general or specific instances), an asset of the entity, a declaration by or on behalf of the entity, and so on.

In embodiments, the computer system 190 generates one or more datasets. A sample generated dataset 135 is shown below the line 115. The dataset 135 has values that can be numerical, alphanumeric, Boolean, and so on, as needed for what the values characterize. For example, an identity value ID may indicate an identity of the dataset 135, so as to differentiate it from other such datasets. At least one of the values of the dataset 135 may characterize an attribute of a certain one of the entities 193 and 196. (It should be noted that the arrows 199 describe a correspondence, but not the journey of data in becoming the dataset 135.) For instance, a value D1 may be the name of the certain entity, a value D2 may be for relevant data of the entity, and so on. Plus, an optional value B1 may be a numerical base value for an aspect of the dataset, and so on. The aspect of the dataset may be the aspect of the value that characterizes the attribute, an aspect of the reason that the dataset was created in the first place, an indication of an identity or other characteristic of the client 193 and/or the secondary entity 196. The dataset 135 may further have additional such values, as indicated by the horizontal dot-dot-dot to the right of the dataset 135. In some embodiments, the dataset 135 has values that characterize attributes of each of the client 193 and the secondary entity 196, but that is not required.

In embodiments, stored digital rules 170 may be accessed by the computer system 195. These rules 170 are digital in that they are implemented for use by software. For example, these rules 170 may be implemented within programs 131 and data 138. The data portion of these rules 170 may alternately be implemented in memories in other places, which can be accessed via the network 188. These rules 170 may be accessed responsive to receiving a dataset, such as the dataset 135.

The digital rules 170 may include main rules, which can thus be accessed by the computer system 195. In this example, three sample digital main rules are shown explicitly, namely M_RULE5 175, M_RULE6 176, and M_RULE7 177. In this example, the digital rules 170 also include digital precedence rules P_RULE2 172 and P_RULE3 173, which can thus be further accessed by the computer system 195. The digital rules 170 may include additional rules and types of rules, as suggested by the vertical dot-dot-dots.

In embodiments, a certain one of the digital main rules may be identified from among the accessed stored rules by the computer system 195. In particular, values of the dataset 135 can be tested, according to arrows 171, against logical conditions of the digital main rules, as described later in this document. In this example, the certain main rule M_RULE5 175 is thus identified, which is indicated also by the beginning of an arrow 178 that is described in more detail later in this document. Identifying may be performed in a number of ways depending on how the digital main rules are implemented. An example is now described.

Figure 2:
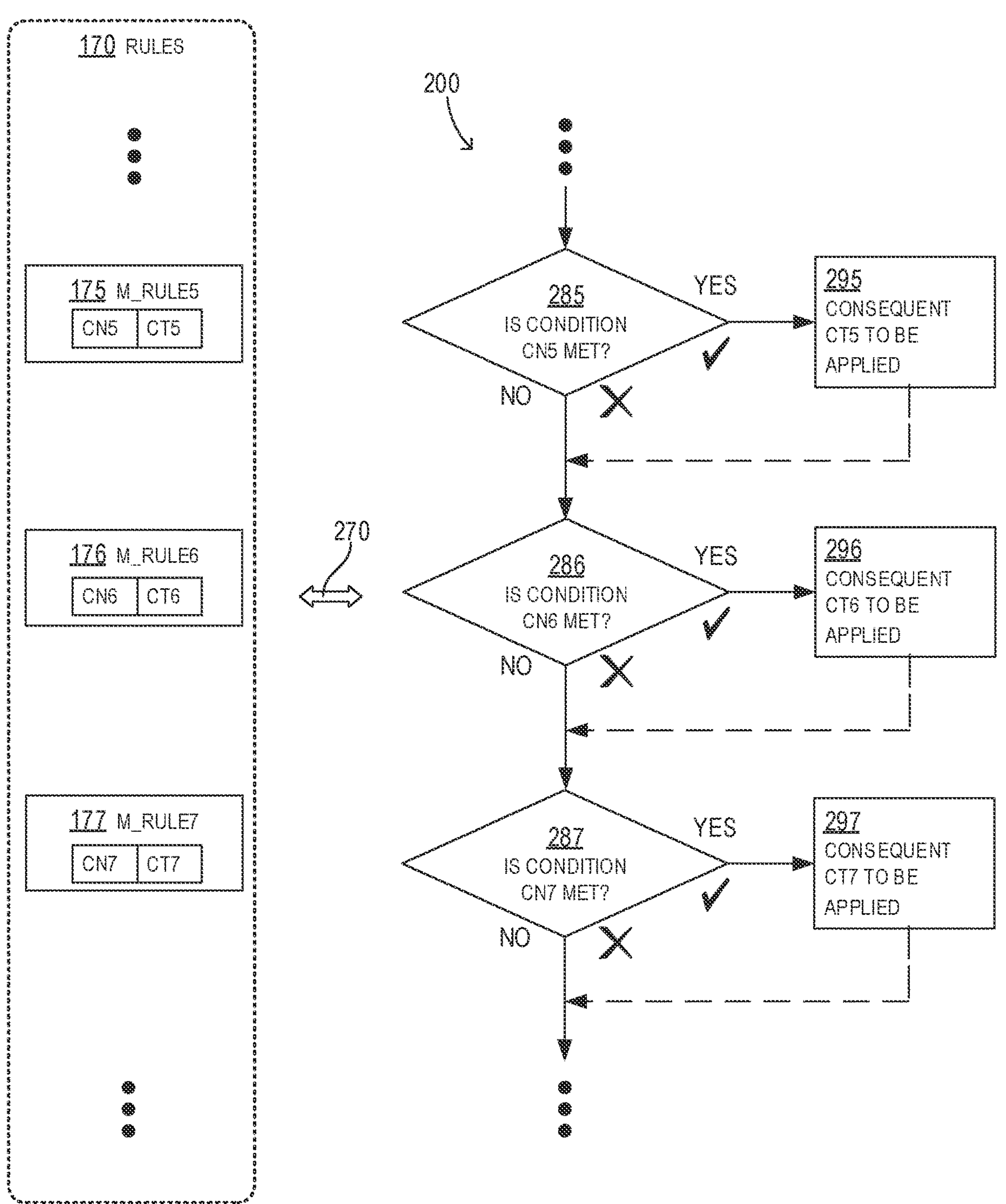
FIG. 2 is a diagram that repeats some of the digital main rules of FIG. 1 in more detail, and juxtaposes them with a flowchart portion for a sample method of how it may be recognized that conditions of a certain digital main rule can be met for its consequent to be applied, all according to embodiments of the present disclosure, which is an improvement in automated computerized systems.

Referring now also to FIG. 2, some of the digital main rules of digital rules 170 are repeated from FIG. 1 in more detail. In addition, according to an arrow 270, these digital main rules are shown juxtaposed with a flowchart portion 200. In embodiments, some of the digital main rules can be expressed in the form of a logical "if-then" statement, such as: "if P then Q". In such statements, the "if" part, represented by the "P", is called the condition, and the "then" part, represented by the "Q", is called the consequent. Therefore, at least some of the digital main rules include respective conditions and respective consequents associated with the respective conditions, respectively. And, for a certain digital main rule, if its certain condition P is met, then its certain consequent Q is what happens or becomes applied. Of course, one or more of the digital rules 170 may have more than one conditions P that both must be met, and so on. And some of these digital rules 170 may be searched for, and grouped, according first to one of the conditions, and then the other. In this example, the digital main rules M_RULE5 175, M_RULE6 176, and M_RULE7 177 of FIG. 1, include respective conditions CN5, CN6, CN7, and respective consequents CT5, CT6, CT7 associated with the respective conditions CN5, CN6, CN7, respectively.

In embodiments, therefore, identifying is performed by recognizing, by the computer system 195, that a certain condition of a certain one of the accessed digital main rules is met by one or more of the values of the dataset. An example of the operations of recognizing that a condition is met and thus identifying an applicable rule is shown by flowchart portion 200 of FIG. 2. According to successive decision diamonds 285, 286, 287, it is determined whether or not conditions CN5, CN6, CN7 are met by at least one of the values of the dataset, respectively. If the answer is NO, then execution may proceed to the next diamond. If the answer is YES then, according to operations 295, 296, 297, it is further determined that the respective consequents CT5, CT6, CT7 are to be applied, and then execution may proceed to the next diamond in the flowchart portion. A consequent that is to be applied could be, for example, flagged as TRUE.

From what was mentioned in connection with FIG. 1, the certain M_RULE5 175 was thus identified. With reference to FIG. 2, the identification may have happened at operation 285 of the flowchart portion 200, at which time it was recognized that condition CN5 was met by a value of the dataset 135. This made: the condition CN5 be the certain condition, the digital main rule M_RULE5 175 be the certain digital main rule, and the consequent CT5 be the certain consequent of the certain digital main rule M_RULE5 175. And the certain consequent CT5 is associated with the certain condition CN5, since both are included by the certain digital main rule M_RULE5 175. Therefore, according to operation 295, consequent CT5 is what happens or becomes applied, as described below.

A number of examples are possible for how to recognize that a certain condition of a certain digital rule is met by at least one of the values of the dataset. For instance, the certain condition could define a boundary of a region that is within a space. The region could be geometric, and even be within a larger space and may include political boundaries. For example, the region could be geographic, within the space of a city, a county, a state, a country, a continent or the earth. The boundary of the region could be defined in terms of numbers according to a coordinate system within the space. In the example of geography, the boundary could be defined in terms of groups of longitude and latitude coordinates. In such embodiments, the certain condition could be met responsive to the characterized attribute of the dataset being in the space and within the boundary of the region instead of outside the boundary. For instance, the attribute could be a location of the entity, and the one or more values of the dataset 135 that characterize the location could be one or more numbers or an address, or longitude and latitude. The condition can be met depending on how the one or more values compare with the boundary. For example, the comparison may reveal that the location is in the region instead of outside the region. The comparison can be made by rendering the characterized attribute in units comparable to those of the boundary. For example, the characterized attribute could be an address that is rendered into longitude and latitude coordinates, and so on.

The above embodiments are only examples, and not limiting. For instance, the example of FIG. 2 suggests that there is a one-to-one correspondence of the conditions with the associated consequents, but that is not necessary. In fact, a single consequent may be associated with two or more conditions, and two or more consequents may be associated with a single condition. Of course, all such can be shown as additional rules, with groups of them having the same condition or consequent.

For another instance, once it is determined that a consequent is to be applied, execution may even exit the flowchart portion 200. Or, as shown, it may be determined that more than one of the digital main rules is to be applied. In particular, operation 285 may give the answer YES such that consequent CT5 is to be applied, and operation 286 may also give the answer YES such that consequent CT6 is to be applied.

Where more than one of the digital main rules are found that could be applied, there are additional possibilities. For instance, the computer system 195 of FIG. 1 may further access at least one stored digital precedence rule, such as P_RULE2 172 or P_RULE3 173. Accordingly, the certain digital main rule may be thus identified also from the digital precedence rule. In particular, the digital precedence rule may decide which one or more of the digital main rules is to be applied. To continue the previous example, if a value of the dataset 135 that characterizes a location, and the location is within multiple overlapping regions according to multiple rules, the digital precedence rule may decide that all of them are to be applied, or less than all of them are to be applied.

Equivalent embodiments are also possible, where digital precedence rules are applied first to limit the iterative search of the flowchart portion 200, so as to test the applicability of fewer than all the rules according to arrows 171.

In embodiments, a resource may be produced for the dataset 135, by the computer system 195 applying the certain consequent of the certain digital main rule. The resource can be a computational result, a document, an item of value, a representation of an item of value, etc., made, created or prepared for the user 192, the client 193 and/or the secondary entity 196, etc., on the basis of the attribute. As such, in some embodiments, the resource is produced by a determination and/or a computation. In the example of FIG. 1, a resource 179 is produced for the dataset 135, by the computer system 195 applying the certain M_RULE5 175, and in particular its certain consequent CT5, as indicated by the arrow 178. In fact, sometimes applying the consequent is more simply stated as "applying the rule".

The resource may be produced in a number of ways. For example, the certain consequent can be applied to one of the values of the dataset 135. For instance, one of the values of the dataset 135 can be a numerical base value, e.g. B1, that encodes an aspect of the dataset 135, as mentioned above. In such cases, applying the certain consequent may include performing a mathematical operation on the base value B1. For example, applying the certain consequent may include multiplying the base value B1 with a number indicated by the certain consequent. Such a number can be, for example, a percentage, e.g., 1.5%, 3%, 5%, and so on. Such a number can be indicated directly by the certain rule, or be stored in a place indicated by the certain rule, and so on.

As mentioned above, in some embodiments two or more digital main rules may be applied. For instance, referring again to FIG. 1, the computer system 195 may recognize that an additional condition of an additional one of the accessed digital main rules 170 is met by at least one of the values of the dataset 135. In this example there would be no digital precedence rules, or the available digital precedence rules would not preclude both the certain digital main rule and the additional digital main rule from being applied concurrently. Such an additional digital main rule would have an additional consequent.

In such embodiments, the resource may be produced by the computer system applying the certain consequent and the additional consequent. For instance, where the base value B1 is used, applying the certain consequent may include multiplying the base value B1 with a first number indicated by the certain consequent, so as to compute a first product. In addition, applying the additional consequent may include multiplying the base value B1 with a second number indicated by the additional consequent, so as to compute a second product. And, the resource may be produced by summing the first product and the second product.

In embodiments, a notification can be caused to be transmitted, e.g., via the network 188, by the computer system. The notification can be about an aspect of the resource. In the example of FIG. 1, a notification 136 can be caused to be transmitted by the computer system 195, for example as an answer or other response to the received dataset 135. The notification 136 can be about an aspect of the produced resource 179. In particular, the notification 136 may inform about the aspect of the resource 179, namely that it has been determined, where it can be found, what it is, or at least a portion or a statistic of its content, a rounded version of it, and so on. The planning should be that the recipient of the notification 136 understands what it is being provided.

The notification 136 can be transmitted to one of an output device and another device. The output device may be the screen of a local user or a remote user. The notification 136 may thus cause a desired image, message, or other such notification to appear on the screen, such as within a Graphical User Interface (GUI) and so on. The other device can be the remote device, from which the dataset 135 was received, as in the example of FIG. 1. In particular, the computer system 195 may cause the notification 136 to be communicated by being encoded as a payload 137, which is carried by a response 187. The response 187 may be transmitted via the network 188 responsive to the received request 184. The response 187 may be transmitted to the computer system 190, or to OPF 189, and so on. As such, the other device can be the computer system 190, or the OPF 189, or the screen 191 of the user 192, and so on. In this example, the single payload 137 encodes the entire notification 136, but that is not required. Similarly with what is written above about encoding datasets in payloads, the notification 136 instead may be provided via two or more payloads, or in other cases the notification 136 and at least one other notification may be included in the same single payload. Along with the aspect of the resource 179, it can be advantageous to embed in the payload 137 the identity value (ID) and/or one or more values of the dataset 135. This will help the recipient correlate the response 187 to the request 184, and therefore match the received aspect of the resource 179 as the answer or other response to the appropriate dataset.

In an example embodiment, there may be a plurality of relationship instances between the client 193 and one or more secondary entities, such as secondary entity 196. In some embodiments, such relationship instances are between the client 193 and one or more secondary entities, such as secondary entity 196, via one or more intermediary entities (not shown). Each relationship instance may be associated with one or more respective domains of a plurality of domains. In various embodiments, a domain may be a region defined by a boundary as discussed above or may be an entity representing or otherwise associated with the region. For example, the region could be geographic, within the space of a city, a county, a state, a country, a continent or the earth.

For example, in one embodiment, client 193 may have a relationship instance 197 with secondary entity 196 and that particular relationship instance 197 may be associated with one or more domains. The association of the relationship instance 197 with the one or more domains may be based on a variety of characteristics including, but not limited to: a relationship of one or more of the primary entity and secondary entity with the particular domain; a location of one or more of the primary entity and secondary entity within or associated with the particular domain; a region or location associated with one or more of the primary entity and secondary entity being within or associated with the particular domain; a previous relationship of one or more of the primary entity and secondary entity with the particular domain; a location of items associated with one or more of the primary entity and secondary entity within the particular domain; a number of relationships of one or more of the primary entity and secondary entity with the particular domain; a transfer of items associated with one or more of the primary entity and secondary entity to or from an entity within or associated with the particular domain; a transfer of data associated with one or more of the primary entity and secondary entity to or from an entity within or associated the particular domain, etc. The existence or identification of the relationship instance 197 and/or one or more characteristics of the relationship instance 197 may be defined or represented by values of dataset 135.

In some embodiments, for each relationship instance of the plurality of relationship instances represented by dataset 135, the OSP 198 electronically identifies a rate to calculate an amount of resource due to one or more respective domains associated with the relationship instance based on particular attributes of the dataset 135 and the one or more respective domains. For example, the client 193 may send request 184 to the computer system 195 of OSP 198 for services that include producing resources based on the dataset 135. The request 184 may include the existence or identification of the relationship instance 197 and/or one or more characteristics of the relationship instance 197 as part of payload 134. The service engine 183 may then apply digital rules 170 to the relationship instance 197 and/or one or more characteristics of the relationship instance 197 to identify or otherwise determine the rate to calculate an amount of resource due to one or more respective domains associated with the relationship instance.

For example, digital precedence rule P_RULE2 172 may decide that rule M_RULE5 175 is to be applied when a particular condition is met. Digital precedence rule P_RULE2 172 may include a condition that indicates if a particular relationship instance is associated with a particular domain, then rule M_RULE5 175 is to be applied. The service engine 183 may determine that the condition is met due to one or more values of dataset 135 indicating the particular relationship instance and that the particular relationship instance is associated with the particular domain. Thus, as a consequent of precedence rule P_RULE2 172, the service engine 183 applies rule M_RULE5 175. Rule M_RULE5 175 may include a condition CN5 that indicates if a relationship instance is associated with that particular domain, then, as consequent CT5, a particular rate is to be used to calculate an amount of resource due to that particular domain.

Referring again to FIG. 2, at decision diamond 285 it is determined that the condition CN5 is met (i.e., that a particular attribute of the dataset is associated with a particular domain) and thus, the particular rate is used to calculate an amount of resource due to that particular domain. Thus, by applying digital rules 170, the service engine 183 identifies the rate to calculate an amount of resource due to one or more respective domains associated with the relationship instance based on one or more attributes of the dataset 135, and also calculates an amount of resources due to at least one respective domain associated with the relationship instance based on the identified rate. In some embodiments, this calculated amount of resources due may be included by the service engine 183 as part of the resulting produced resource 179 and/or notification 136. The service engine 183 may then form a payload 137 that is an aspect of the resource 179, and then push, send, or otherwise cause to be transmitted a response 187 that carries the payload 137 to a device remote to the service engine 183, such as computer system 190, a device of secondary entity 196 or another secondary entity. Digital rules 170 may include multiple different digital rules for each type of relationship instance and different domains. In various embodiments, the notification 136 may comprise the response 187, or the response 187 may be included in the notification 136.

In some instances, when the client 193 requests service of the OSP 198, the client 193 and/or the OSP 198 is not aware of future digital rules that may not be in existence, not yet applicable, not yet accessible, are otherwise not yet specified and/or have not yet been stored by the OSP 198. Thus, in the present embodiment, the OSP 198 enables future resource production (FUTREP) for clients, such as client 193, according to presently unspecified digital rules. In particular, the OSP enables client 193 to additionally have the OSP 198 produce one or more additional resources for the dataset 135 according to such future digital rules. For example, the OSP 198 may initially receive a settings request from a client for an electronic service of producing one or more resources for a dataset that the client will provide subsequently to the OSP 198 according to one or more first digital rules of digital rules 170 presently stored in a first memory, such as M_RULE5 175. For example, the first memory may be a memory included in memory 130. The OSP 198 may also provide a first selectable special option to the client 193 to additionally have the OSP 198 produce one or more additional resources for the dataset according to a future digital rule not yet stored in memory. The OSP 198 may receive a first input, such as special option selection 140 as part of request 184, indicating whether or not the client has selected the first special option. In some embodiments, this special option selection 140 may be received with, in conjunction with, or as part of the payload 134. In some embodiments, the request 184 may include the dataset 135. However, in the present embodiment, the special option selection 140 is received before the dataset 135. In various embodiments, the special option selection 140 may be received by the OSP 198 during or after the initial onboarding or subscription of the client 193 to the services of the OSP 198.

In the present example embodiment, after receiving the special option selection 140, the OSP 198 then learns about and stores a second digital rule, such as digital rule M_RULE6 176 in a second memory. For example, the second memory may be a memory included in memory 130. The OSP 198 then receives dataset 135. The OSP 198 produces a first resource based on identifying and applying one or more first digital rules of digital rules 170, such as M_RULE5 175 to the dataset 135 indicated by beginning of arrow 178. If the special option selection 140 has been received, then the OSP 198 may recognize that the second digital rule, such as digital rule M_RULE6 176, is applicable to the dataset 135 as indicated by the beginning of line 179 and that the special option selection 140 indicates the second digital rule as the future digital rule. For example, the applicability of the second digital rule, such as digital rule M_RULE6 176, to the dataset 135 and that the second digital rule was not stored or specified at the time when the special option selection 140 was received indicates that the second digital rule is such a future digital rule as indicated by the special option selection 140. In some embodiments, the special option selection 140 having been received by the OSP 198 is a condition that must be met that is indicated by a digital precedence rule, such as P_RULE2 173, for rule M_RULE5 176 to be applied.

The OSP 198 then further produces a second resource as resource 179 based on applying the second digital rule, such as digital rule M_RULE6 176, to the dataset 135 as indicated by line 179 to produce a resource component and then adding the resource component to the first resource, as indicated by the end of arrow 178. The OSP 198 then transmits a response, such as notification 136, to the client 193 regarding resource 179. Else, if the special option selection 140 has not been received, then the OSP 198 does not produce the second resource and instead transmits, as resource 179, a response to the client 193 regarding the first resource. Notification 136 may include such a response.

In this manner, future digital rules which may not be in existence, not yet applicable, not yet accessible, are otherwise not yet specified and/or have not yet been stored by the OSP 198 may be automatically applied to datasets of clients, such as client 193, avoiding the client 193 and OSP 198 having to request such future digital rules to be applied each time they are saved or updated by the OSP 198, and also avoiding the client 193 and OSP 198 having to go back and revise previously produced resources based on future digital rules. This improves computerized networks by more efficiently using computing and network resources to increase the accuracy and speed of the networked computing system.

Figure 3:
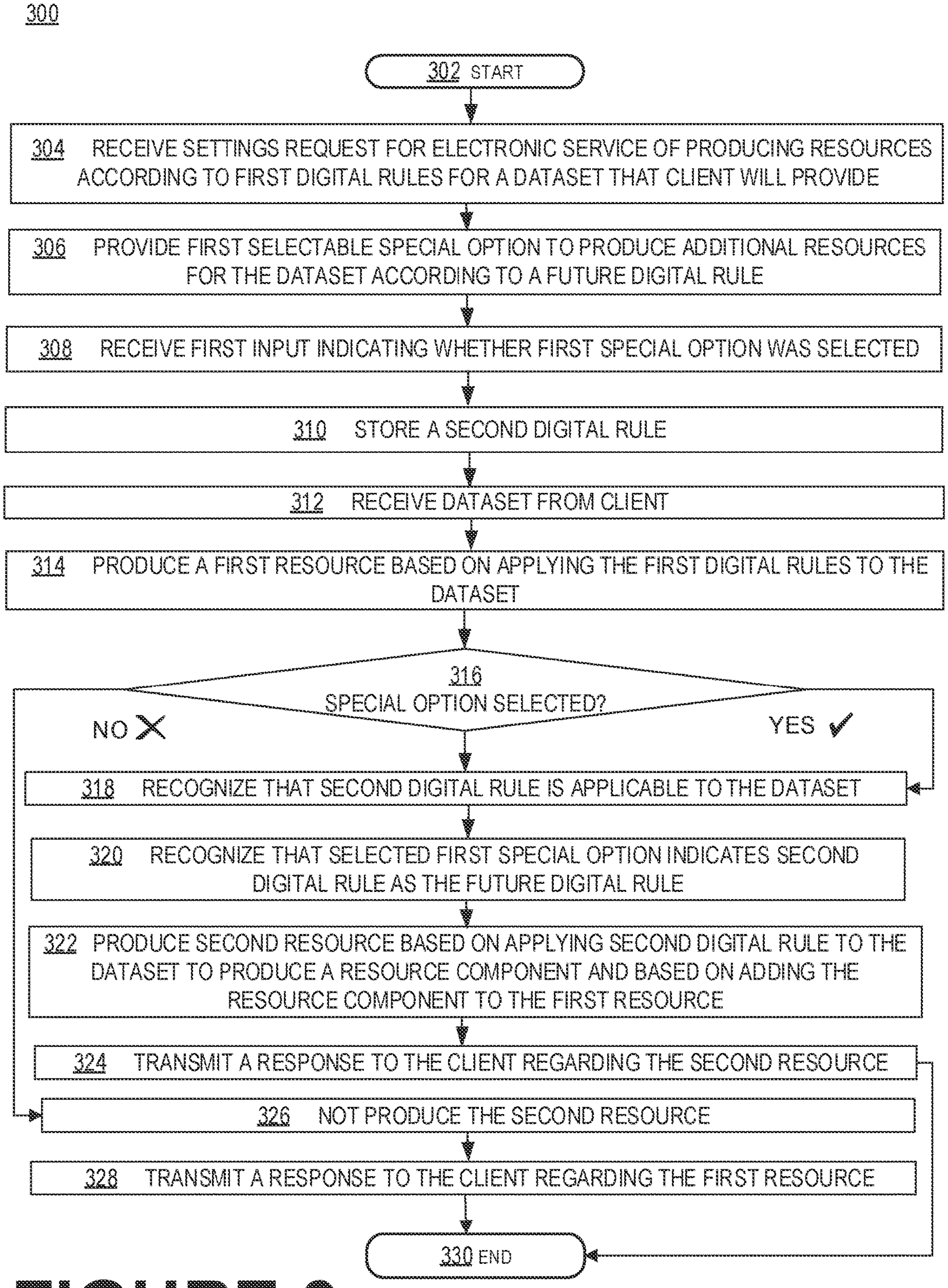
FIG. 3 is a flowchart for illustrating a sample method for enabling FUTREP according to presently unspecified digital rules, according to embodiments of the present disclosure, which is an improvement in automated computerized systems.

FIG. 3 is a flowchart for illustrating a sample method 300 for enabling FUTREP according to presently unspecified digital rules, according to embodiments of the present disclosure, which is an improvement in automated computerized systems.

Although, in the present example, the operations and methods described with reference to the flowcharts illustrated in FIGS. 3, 5, 6 and 7 are described as being performed by the OSP 198, in various embodiments, one or more of the operations and methods described with reference to the flowcharts illustrated 3, 5, 6 and 7 may be performed by the client computer system 190 of client 193.

The method 300 starts at 302.

At 304 the OSP 198 receiving a settings request from a client for an electronic service of producing one or more resources for a dataset that the client will provide subsequently to the OSP 198. The dataset represents a relationship instance of the client with a secondary entity, the relationship instance being associated with one or more domains. The one or more resources are to be produced according to one or more first digital rules presently stored in a first memory.

At 306, the OSP 198 provides a first selectable special option to the client to additionally have the OSP 198 produce one or more additional resources for the dataset according to a future digital rule.

At 308, the OSP receives first input indicating whether or not the client has selected the first special option, in which the future digital rule is not yet specified and not yet stored in a second memory at a time when the first input is received.

At 310, the OSP 198 then stores a second digital rule in the second memory.

At 312, the OSP 198 then receives the dataset from the client.

At 314, the OSP 198 produces a first resource based on applying the one or more first digital rules to the dataset.

At 316, the OSP 198 determines whether or not the first special option has been selected. If the first special option has been selected, the method 300 proceeds to 318. If the first special option has not been selected, the method 300 proceeds to 326.

At 318, the OSP 198 recognizes that the second digital rule is applicable to the dataset.

At 320, the OSP 198 recognizes that the selected first special option indicates the second digital rule as the future digital rule.

At 322, the OSP 198 further produces a second resource based on applying the second digital rule to the dataset to produce a resource component and based on adding the resource component to the first resource. In some embodiments, the OSP 198 provides a second selectable special option to the client 193 to additionally have the OSP 198 produce one or more additional resource components for the dataset by applying to the dataset a presently applicable digital rule that has become applicable to an item associated with the relationship instance since the request was received. The OSP 198 then receives second input indicating whether or not the client 193 has selected the second special option and produces the second resource based on the second input.

At 324, the OSP 198 transmits a response to the client regarding the second resource. The method 300 then ends at 330.

At 326, if the first special option has not been selected, then the OSP 198 does not produce the second resource.

At 328, the OSP 198 then transmits a response to the client regarding the first resource.

The method 300 ends at 330.

Figure 4:
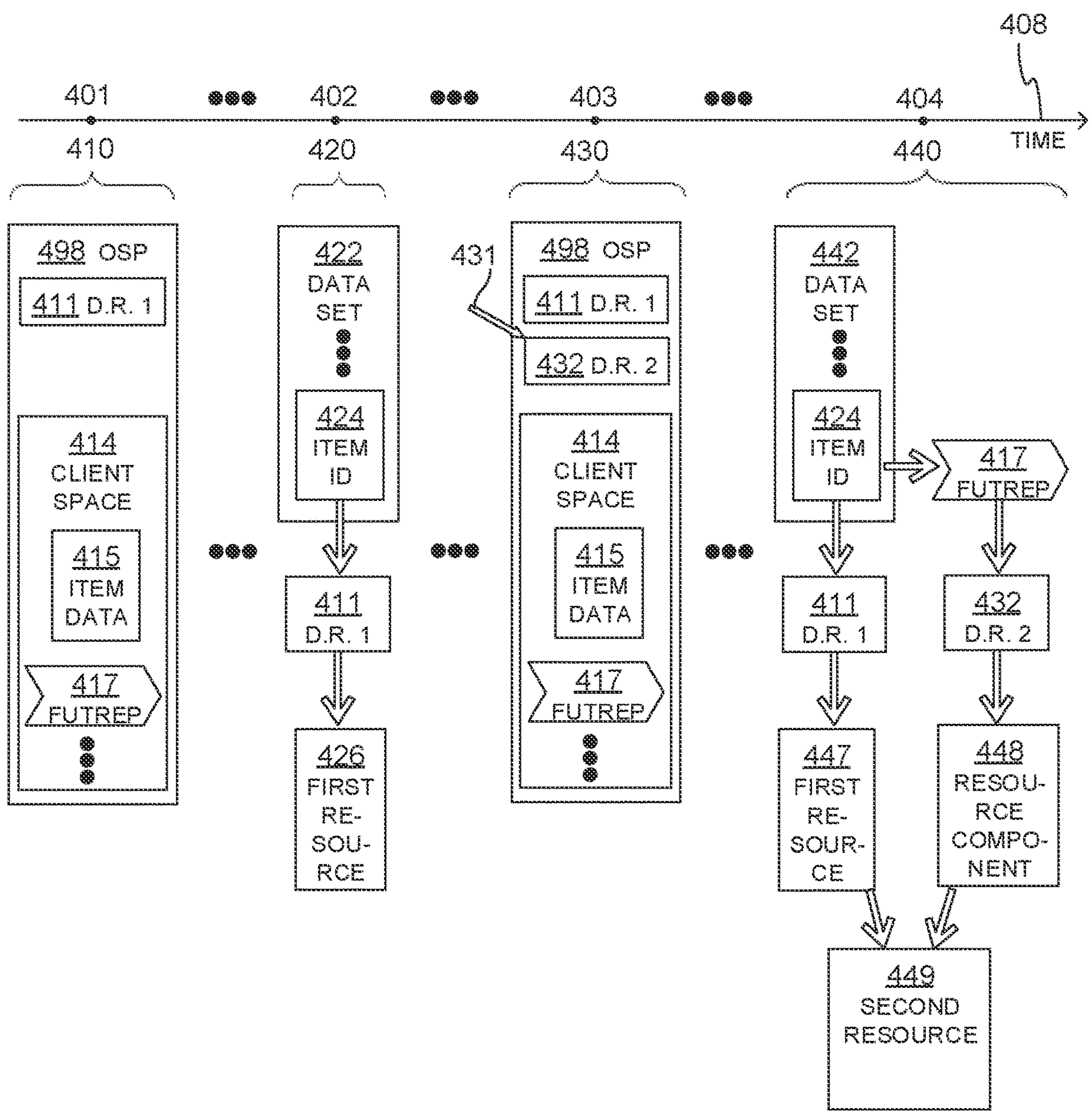
FIG. 4 is a timeline diagram showing sample aspects of embodiments of the present disclosure in a system in which FUTREP is enabled involving producing resources after a selectable a special option has been selected to additionally have the produce additional resources for datasets based on future digital rules according to embodiments of the present disclosure, which is an improvement in automated computerized systems.

FIG. 4 is a timeline diagram showing sample aspects of embodiments of the present disclosure in a system in which FUTREP is enabled involving producing resources after a selectable special option has been selected to additionally have the OSP 198 produce additional resources for datasets based on future digital rules according to embodiments of the present disclosure, which is an improvement in automated computerized systems.

Shown is a timeline 408 with time intercepts 401, 402, 403, and 404. Varying amounts of time may pass on timeline 408 between time intercepts 401, 402, 403, and 404. Also shown are corresponding system instances 410, 420, 430 and 440 each including a diagram illustrating system entities and/or components and their relationships and/or interactions and associated processing of data that occurs at each corresponding time intercept. In particular, at time intercept 401, system instance 410 indicates that the OSP 498, which is an example of OSP 198 of FIG. 1, has stored a digital rule 1 411, which is an example digital rule of digital rules 170 of FIG. 1.

In the present example, at time intercept 401, the OSP 498 has stored in client space 414, item data 415 that includes data regarding items associated with a relationship instances of a client, such as client 193 of FIG. 1. Such relationship instances of the client are represented by datasets received from the client. For example, the client space may be a portion of memory, such as a portion of memory 130, associated with or dedicated to storing data regarding a particular client, such as client 193. The item data 415 may be data extracted form, identified by or otherwise associated with datasets of the client. Also stored in client space 414 is a FUTREP indication 417, which indicates that the client 193 has selected to additionally have the OSP 498 produce one or more additional resources for the dataset according to a future digital rule.

At time intercept 401, the OSP 498 receives dataset 422 from the client, which includes an item ID 424 identifying a type of item that is the subject of a relationship instance of the client, such as client 193 of FIG. 1, represented by dataset 422 received from the client by OSP 498. Based on characteristics of the item identified by item ID 424 and/or the associated relationship instance, the OSP 498 identifies digital rule 1 411 currently stored by the OSP 498 as applicable to the item. The OSP 498 applies digital rule 1 411 to the relationship instance associated with the item and produces a first resource 426 based on the application of digital rule 1 411 to the associated relationship instance. The OSP 498 may transmit a response to the client regarding first resource 426. Although the client 193 has selected to additionally have the OSP 193 produce one or more additional resources for the dataset according to a future digital rule, such a future digital rule has not yet been received, stored, identified or otherwise specified.

At time intercept 430, the OSP 498 stores digital rule 2 432 in memory. Digital rule 2 has not been previously stored by the OSP 498 or specified. In some embodiments, digital rule 2 432 may be stored in a different memory or portion of memory than digital rule 1 411 and thus does not replace digital rule 1 411, but supplements digital rule 1 411.

At time intercept 440, the OSP 498 receives dataset 442 from the client, which includes an item ID 424 identifying a type of item that is the subject of a relationship instance represented by dataset 442. Based on characteristics of the item identified by item ID 424 and/or the associated relationship instance represented by dataset 442, the OSP 498 again identifies digital rule 1 411 stored by the OSP 498 as applicable to the item based on the type of item indicated by the same item ID 424. The OSP 498 applies digital rule 1 411 to the relationship instance associated with the item and produces another first resource 447 based on the application of digital rule 1 411 to the associated relationship instance represented by dataset 442. However, at time intercept 440 digital rule 2 432 has now been stored by the OSP 498, as shown in previous time intercept 430. Digital rule 2 432 is recognized by the OSP 498 as also applicable to the dataset 442 based on item ID 424 and has thus been recognized by the OSP 498 as the future digital rule indicated by the FUTREP indication 417 according to which additional resources are to be produced. The OSP 498 accordingly applies digital rule 2 432 to the relationship instance associated with the item and produces resource component 448 based on the application of digital rule 2 432 to the associated relationship instance represented by dataset 442.

The OSP 498 then produces second resource 449 based on first resource 447 and resource component 448. For example, second resource 449 may be computed as, or based on, the sum of first resource 447 and resource component 448. The OSP 498 may transmit a response to the client regarding second resource 449.

Figure 5:
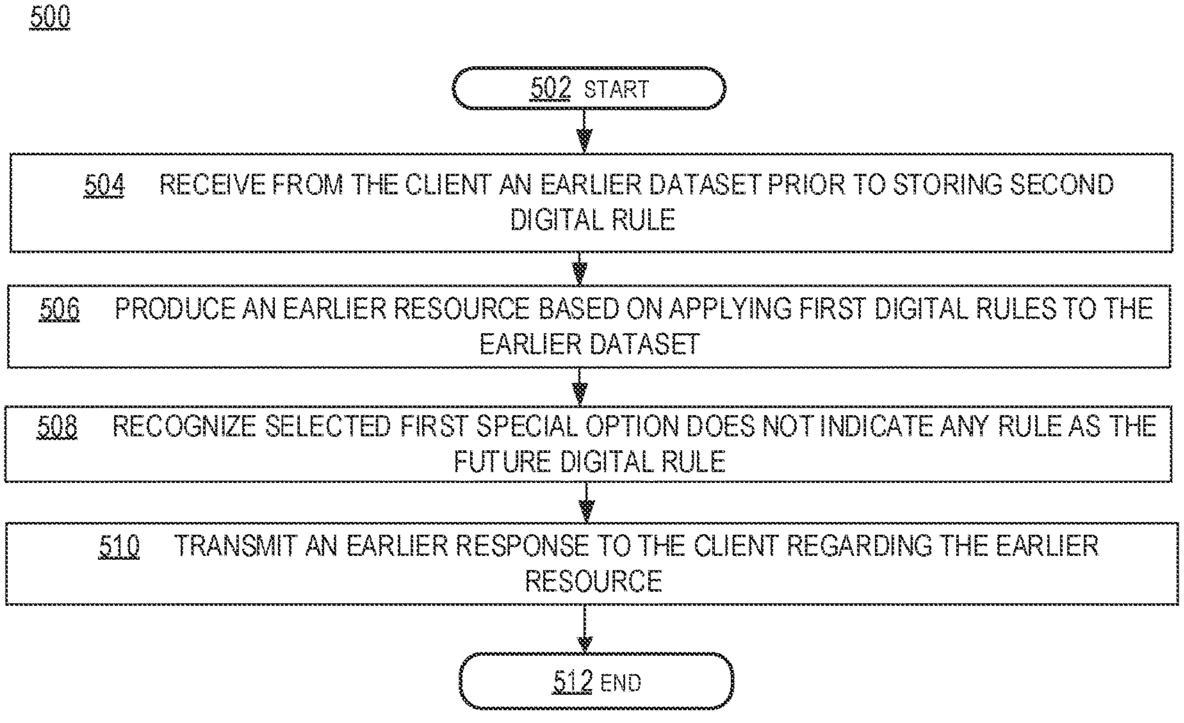
FIG. 5 is a flowchart for illustrating a sample method in which FUTREP is enabled but the selected special option to additionally have the OSP produce additional resources for datasets according to a future digital rules does not indicate any rule as the future digital rule, according to embodiments of the present disclosure, which is an improvement in automated computerized systems.

FIG. 5 is a flowchart for illustrating a sample method 500 in which FUTREP is enabled but the selected special option to additionally have the OSP 198 produce additional resources for datasets according to a future digital rules does not indicate any rule yet as the future digital rule, according to embodiments of the present disclosure, which is an improvement in automated computerized systems. In embodiments, the method 500 is performed as further operations to those of method 300.

The method 500 starts at 502.

At 504, the OSP 198 receives from the client 193 an earlier dataset prior to storing the second digital rule in the second memory.

At 506, the OSP 198 produces an earlier resource based on applying the one or more first digital rules to the earlier dataset.

At 508, responsive to the first special option having been selected, the OSP 198 recognizes that the selected first special option does not indicate any rule as the future digital rule.

At 510, the OSP 198 transmits an earlier response to the client regarding the earlier resource.

The method 500 ends at 512.

FIG. 6 is a flowchart for illustrating a sample method 600 in which FUTREP is enabled involving pre-association of digital rules with respective items to which the digital rules apply, according to embodiments of the present disclosure, which is an improvement in automated computerized systems. In embodiments, the method 500 is performed as further operations to those of method 300.

The method 600 starts at 602.

At 604, in response to the storing the second digital rule, the OSP 198 searches for items to which the second digital rule applies.

At 606, as a result of the search, the OSP 198 identifies clients associated with respective ones of the items and that have requested the OSP 198 to produce respective resources for datasets of the clients. For example, the OSP 198 may determine that a particular client is associated with a respective item based on the respective item being a subject of one or more relationship instances represented by one or more datasets previously received from the particular client. In some embodiments, the OSP 198 determines that a particular client is associated with a respective item based on the particular client declaring to the OSP 198 that the respective item is associated with relationship instances of the particular client.

At 608, of the identified clients, the OSP 198 determines which have selected, prior to storing the second digital rule, the first special option.

At 610, for each of the determined clients, the OSP 198 pre-associates the second digital rule with the respective item to which the second digital rule applies.

At 612, the OSP 198 receives datasets from one or more of the determined clients representing respective relationship instances of the determined clients with one or more respective secondary entities.

At 614, the OSP 198 produces additional resources according to the first special option for one or more of the datasets received from the determined clients based on the pre-association.

The method 600 ends at 616.

Figure 7:
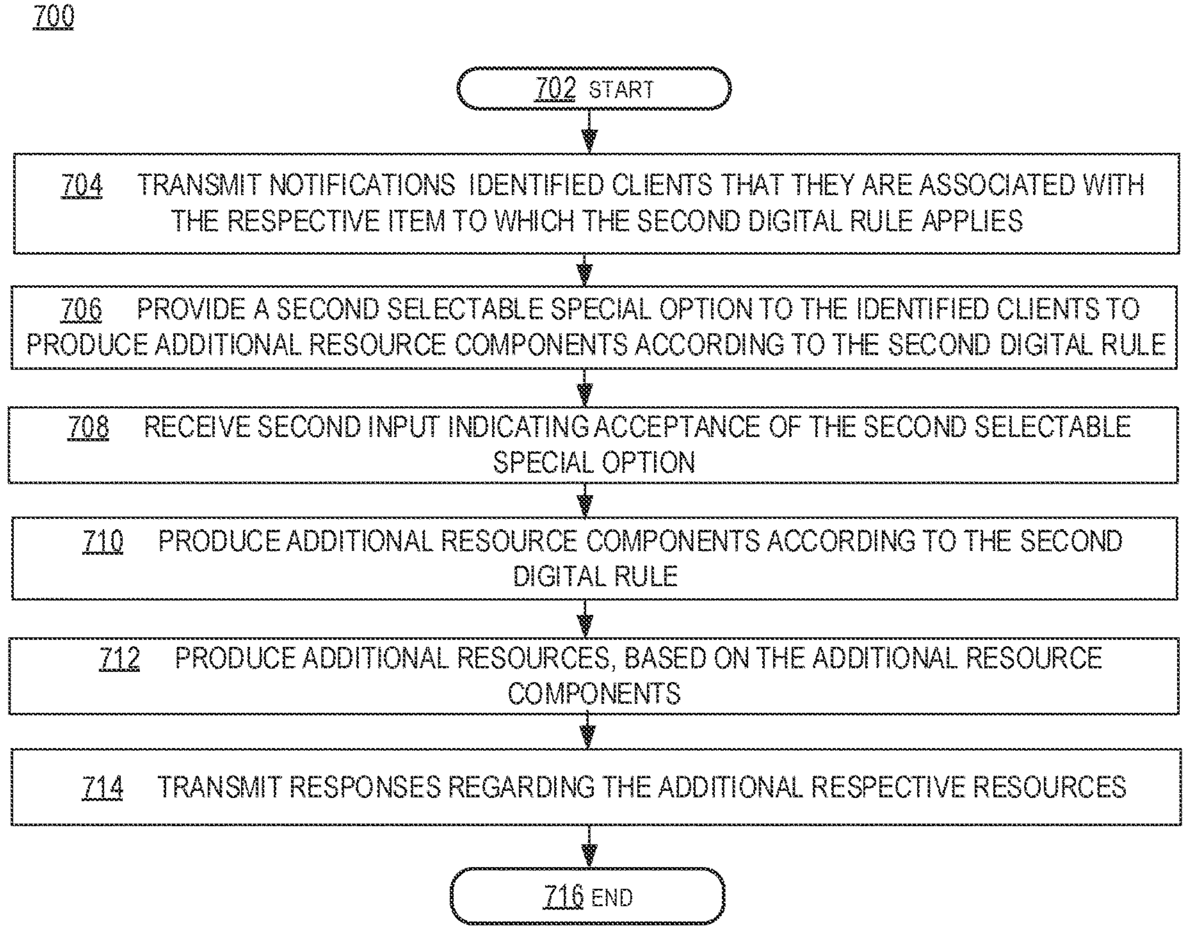
FIG. 7 is a flowchart for illustrating a sample method in which FUTREP is enabled involving providing another selectable special option to additionally have the OSP produce additional resource components according to a digital rule for datasets that were received previous to the storing the digital rule, according to embodiments of the present disclosure, which is an improvement in automated computerized systems.

FIG. 7 is a flowchart for illustrating a sample method 700 in which FUTREP is enabled involving providing another selectable special option to additionally have the OSP 198 produce additional resource components according to a digital rule for datasets that were received previous to the storing the digital rule, according to embodiments of the present disclosure, which is an improvement in automated computerized systems. In embodiments, the method 700 is performed as further operations to those of method 600.

The method 700 starts at 702.

At 704, in response to the identifying clients, for each identified client, the OSP 198 transmits a notification to the identified client that the identified client is associated with the respective item to which the second digital rule applies.

At 706, in conjunction with transmitting the respective notifications, the OSP 198 provides a second selectable special option to the identified clients to additionally have the OSP 198 produce one or more additional resource components according to the second digital rule, for respective datasets that were received from the identified clients previous to the storing the second digital rule.

At 708, the OSP 198 receives second input indicating acceptance of the second selectable special option from one or more of the identified clients.

At 710, based on the acceptance, the OSP 198 produces one or more additional resource components, according to the second digital rule, for respective datasets that were received from the one or more identified clients previous to the storing the second digital rule.

At 712, for each of the one or more of the identified clients, the OSP 198 produces a respective additional resource, based on the additional resource components, for a respective dataset that was received from the client previous to the storing the second digital rule.

At 714, for each of the one or more of the identified clients, the OSP 198 transmits a respective response regarding the respective additional resource to the client.

The method ends at 716.

Figure 8:
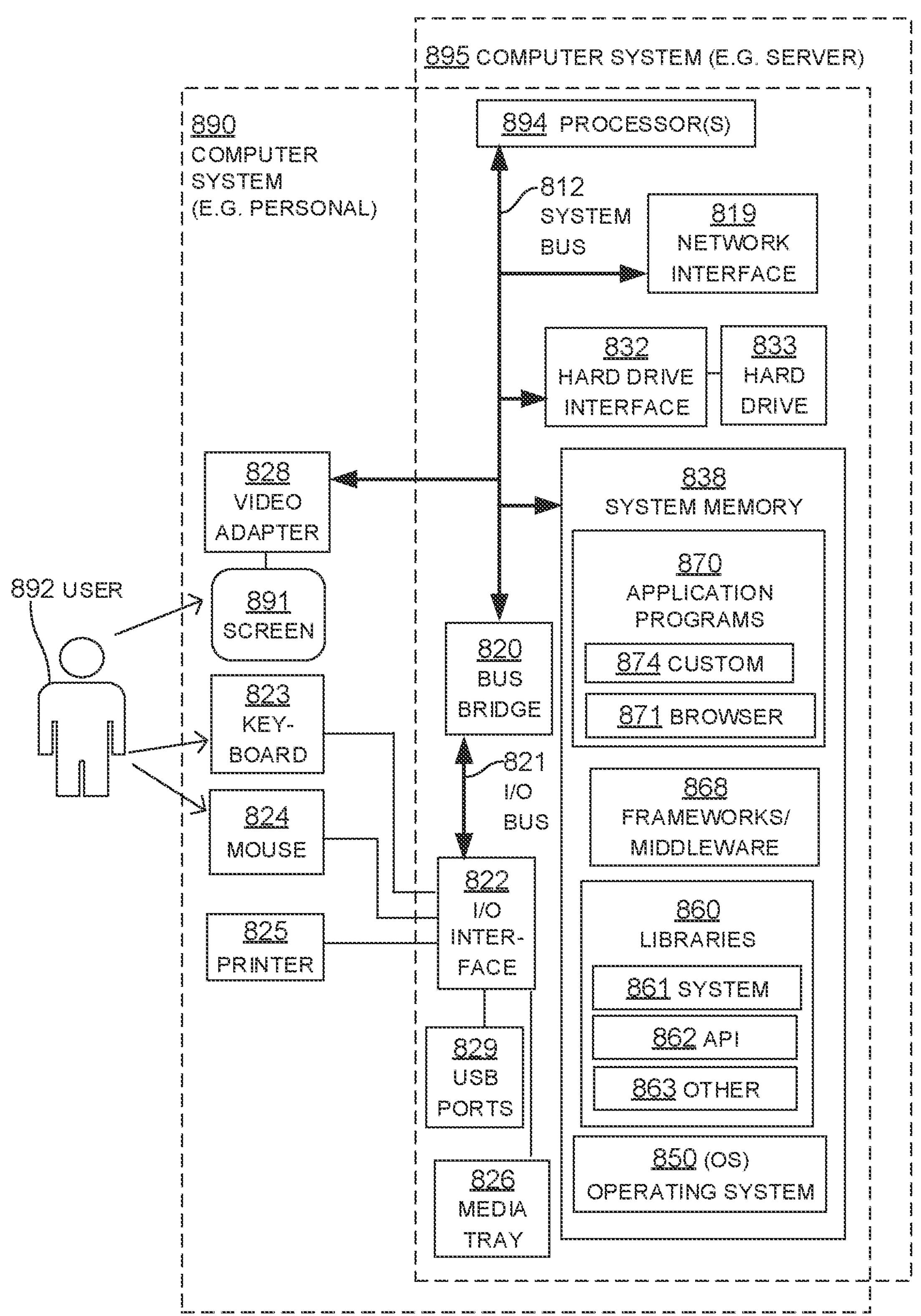
FIG. 8 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

FIG. 8 is a block diagram illustrating components of an exemplary computer system according to some exemplary embodiments, which may read instructions from a machine-readable medium (e.g., a non-transitory computer-readable medium) and perform any one or more of the processes, methods, and/or functionality discussed herein, according to embodiments of the present disclosure, which is an improvement in automated computerized systems.

In the present example, FIG. 8 is a block diagram illustrating components of a sample computer system 890 and a sample computer system 895 according to some exemplary embodiments, which may read instructions from a machine-readable medium (e.g., a non-transitory computer-readable medium) and perform any one or more of the processes, methods, and/or functionality discussed herein. The computer system 895 may be a server, while the computer system 890 may be a personal device, such as a personal computer, a desktop computer, a personal computing device such as a laptop computer, a tablet computer, a mobile phone, and so on. Either type may be used for the computer system 195 and 190 of FIG. 1, a computer system that is part of secondary entity 196 and/or a computer system that is part of any entity or system shown in any of the Figures of the present disclosure.

The computer system 895 and the computer system 890 have similarities, which FIG. 8 exploits for purposes of economy in this document. It will be understood, however, that a component in the computer system 895 may be implemented differently than the same component in the computer system 890. For instance, a memory in a server may be larger than a memory in a personal computer, and so on. Similarly, custom application programs 874 that implement embodiments may be different, and so on.

The computer system 895 includes one or more processors 894. The processor(s) 894 are one or more physical circuits that manipulate physical quantities representing data values. The manipulation can be according to control signals, which can be known as commands, op codes, machine code, etc. The manipulation can produce corresponding output signals that are applied to operate a machine. As such, one or more processors 894 may, for example, include a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores".

A hardware component such as a processor may also include programmable logic or circuitry that is temporarily configured by software to perform certain operations. For example, a hardware component may include software executed by a general-purpose processor or another type of programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, Application Programming Interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. The hardware components depicted in the computer system 895, or the computer system 890, are not intended to be exhaustive. Rather, they are representative, for highlighting essential components that can be used with embodiments.

The computer system 895 also includes a system bus 812 that is coupled to the processor(s) 894. The system bus 812 can be used by the processor(s) 894 to control and/or communicate with other components of the computer system 895.

The computer system 895 additionally includes a network interface 819 that is coupled to system bus 812. Network interface 819 can be used to access a communications network, such as the network 188. Network interface 819 can be implemented by a hardware network interface, such as a Network Interface Card (NIC), wireless communication components, cellular communication components, Near Field Communication (NFC) components, 5G cellular wireless interfaces, transceivers, and antennas, Bluetooth® components such as Bluetooth® Low Energy, Wi-Fi® components, etc. Of course, such a hardware network interface may have its own software, and so on.

The computer system 895 also includes various memory components. These memory components include memory components shown separately in the computer system 895, plus cache memory within the processor(s) 894. Accordingly, these memory components are examples of non-transitory machine-readable media. The memory components shown separately in the computer system 895 are variously coupled, directly or indirectly, with the processor(s) 894. The coupling in this example is via the system bus 812.

Instructions for performing any of the methods or functions described in this document may be stored, completely or partially, within the memory components of the computer system 895, etc. Therefore, one or more of these non-transitory computer-readable media can be configured to store instructions which, when executed by one or more processors 894 of a host computer system such as the computer system 895 or the computer system 890, can cause the host computer system to perform operations according to embodiments. The instructions may be implemented by computer program code for carrying out operations for aspects of this document. The computer program code may be written in any combination of one or more programming languages, including an object-oriented programming language such as Java, Smalltalk or the like, and/or conventional procedural programming languages, such as the "C" programming language or similar programming languages such as C++, C Sharp, etc.

The memory components of the computer system 895 include a non-volatile hard drive 833. The computer system

895 further includes a hard drive interface 832 that is coupled to the hard drive 833 and to the system bus 812.

The memory components of the computer system 895 include a system memory 838. The system memory 838 includes volatile memory including, but not limited to, cache memory, registers and buffers. In embodiments, data from the hard drive 433 populates registers of the volatile memory of the system memory 838.

In some embodiments, the system memory 838 has a software architecture that uses a stack of layers, with each layer providing a particular functionality. In this example the layers include, starting from the bottom, an Operating System (OS) 850, libraries 860, frameworks/middleware 868 and application programs 870, which are also known as applications 870. Other software architectures may include less, more or different layers. For example, a presentation layer may also be included. For another example, some mobile or special purpose operating systems may not provide a frameworks/middleware 868.

The OS 850 may manage hardware resources and provide common services. The libraries 860 provide a common infrastructure that is used by the applications 870 and/or other components and/or layers. The libraries 860 provide functionality that allows other software components to perform tasks more easily than if they interfaced directly with the specific underlying functionality of the OS 850. The libraries 860 may include system libraries 861, such as a C standard library. The system libraries 861 may provide functions such as memory allocation functions, string manipulation functions, mathematical functions, and the like.

In addition, the libraries 860 may include API libraries 862 and other libraries 863, such as for SDKs. The API libraries 862 may include media libraries, such as libraries to support presentation and manipulation of various media formats such as MPEG4, H.264, MP3, AAC, AMR, JPG, and PNG. The API libraries 862 may also include graphics libraries, for instance an OpenGL framework that may be used to render 2D and 3D in a graphic content on the screen 891. The API libraries 862 may further include database libraries, for instance SQLite, which may support various relational database functions. The API libraries 862 may additionally include web libraries, for instance WebKit, which may support web browsing functionality, and also libraries for applications 870.

The frameworks/middleware 868 may provide a higher-level common infrastructure that may be used by the applications 870 and/or other software components/modules. For example, the frameworks/middleware 868 may provide various Graphic User Interface (GUI) functions, high-level resource management, high-level location services, and so forth. The frameworks/middleware 868 may provide a broad spectrum of other APIs that may be used by the applications 870 and/or other software components/modules, some of which may be specific to the OS 850 or to a platform.

The application programs 870 are also known more simply as applications and apps. One such app is a browser 871, which is a software that can permit the user 892 to access other devices in the internet, for example while using a Graphic User Interface (GUI). The browser 871 includes program modules and instructions that enable the computer system 895 to exchange network messages with a network, for example using Hypertext Transfer Protocol (HTTP) messaging.

The application programs 870 may include one or more custom applications 874, made according to embodiments. These can be made so as to cause their host computer to perform operations according to embodiments disclosed herein. Of course, when implemented by software, operations according to embodiments disclosed herein may be implemented much faster than may be implemented by a human mind; for example, tens or hundreds of such operations may be performed per second according to embodiments, which is much faster than a human mind can do.

Other such applications 870 may include Enterprise Resource Planning (ERP) application, accounting applications, financial applications, accounting applications, payment systems applications, database and office applications, contacts application, a word processing application, a location application, a media application, a messaging application, and so on. Applications 870 may be developed for the Windows™ operating system, and/or by using the ANDROID™ or IOS™ Software Development Kit (SDK) by an entity other than the vendor of the particular platform, and may be mobile software running on a mobile operating system such as IOS™, ANDROID™, WINDOWS® Phone, or other mobile operating systems. The applications 870 may use built-in functions of the OS 850, of the libraries 460, and of the frameworks/middleware 868 to create user interfaces for the user 892 to interact with.

The computer system 895 moreover includes a bus bridge 820 coupled to the system bus 812. The computer system 895 furthermore includes an input/output (I/O) bus 821 coupled to the bus bridge 820. The computer system 895 also includes an I/O interface 822 coupled to the I/O bus 821.

For being accessed, the computer system 895 also includes one or more Universal Serial Bus (USB) ports 829. These can be coupled to the I/O interface 822. The computer system 895 further includes a media tray 826, which may include storage devices such as CD-ROM drives, multimedia interfaces, and so on.

The computer system 890 may include many components similar to those of the computer system 895, as seen in FIG. 8. In addition, a number of the application programs may be more suitable for the computer system 890 than for the computer system 895.

The computer system 890 further includes peripheral input/output (I/O) devices for being accessed by a user 892 more routinely. As such, the computer system 890 includes a screen 891 and a video adapter 828 to drive and/or support the screen 891. The video adapter 828 is coupled to the system bus 812.

The computer system 890 also includes a keyboard 823, mouse 824, and a printer 825. In this example, the keyboard 823, the mouse 824, and the printer 825 are directly coupled to the I/O interface 822. Sometimes this coupling is wireless or may be via the USB ports 829.

In this context, "machine-readable medium" refers to a component, device or other tangible media able to store instructions and data temporarily or permanently and may include, but is not be limited to: a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable digital versatile disc (DVD), an optical storage device, a magnetic storage device, or any suitable combination of the foregoing. The machine that would read such a medium includes one or more processors 894.

The term "machine-readable medium" should be taken to include a single medium or multiple media (e.g., a centralized or distributed database, or associated caches and servers) able to store instructions that a machine such as a processor can store, erase, or read. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methods described herein. Accordingly, instructions transform a general or otherwise generic, non-programmed machine into a specialized particular machine programmed to carry out the described and illustrated functions in the manner described.

A computer readable signal traveling from, to, and via these components may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Operational Examples—Use Cases

Figure 9:
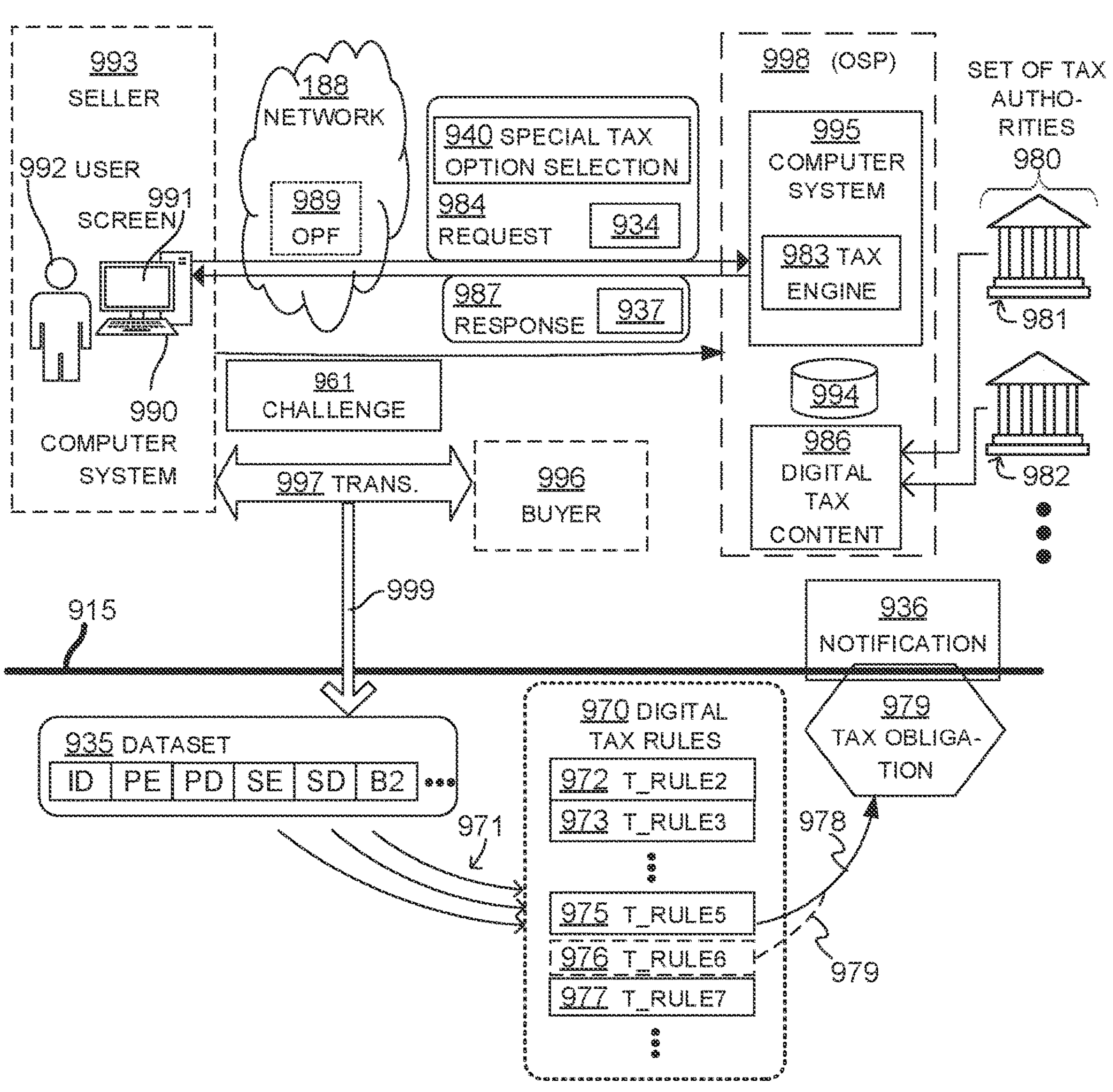
FIG. 9 is a diagram of sample aspects for describing operational examples and use cases of embodiments, according to embodiments of the present disclosure, which is an improvement in automated computerized systems.

The above-mentioned embodiments have one or more uses. Aspects presented below may be implemented as was described above for similar aspects. (Some, but not all, of these aspects have even similar reference numerals.) FIG. 9 is a diagram of sample aspects for describing operational examples and use cases of embodiments, according to embodiments of the present disclosure.

As an example use case, statutes, tax rules, and rates change often, and new tax rules and tax types are continuously added. The OSP 998 researches the underlying statutes and tax rules and guidance issued by the tax authorities 980, uses them to generate or obtain digital tax rules 970 to compute tax obligations (also referred to herein as tax liabilities) for clients, such as seller 993, and makes the research available to all its clients. In addition, the OSP 998 will keep enhancing its coverage of transaction compliance scenarios by enhancing its content and by building logic to determine increasing numbers of different types of compliance liabilities (e.g. tax types) required to be collected and paid to governing authorities, such as tax authorities 980. Clients trust the OSP 998 for compliance and may expect the OSP 998 to take an increasing amount of compliance burden away from their shoulders. However, with more than 10,000 tax jurisdictions in USA alone, it is a mammoth task to stay on top of these changes including presently unspecified additional tax types, and for the OSP 998 to help clients, such as seller 993, stay compliant with their tax obligations.

Thus, embodiments of OSP 998 enable the option of advance FUTREP according to presently unspecified digital tax rules. This provides the ability for the OSP 998 to offer its users an option in which the users can elect in the present to have the OSP 998 make sellers, such as seller 993, compliant with a presently unknown tax obligation on the sellers' future transaction scenarios.

For example, assume that a business today is selling televisions (TVs) in California. This business may be a client of OSP 998, such as seller 993. The business may set up with the OSP 998 to pay sales tax. Further assume that California further assesses an "Electronic Waste Fee" (E-Waste fee) on TVs sold in California in addition to the sales tax. At the time of onboarding to the OSP 998, the seller 993 may have known about this fee, but did not tell the OSP 998 because the seller is dealing with it otherwise, or the seller 993 may not know about this fee. For example, the seller 993 may have not researched the topic hard enough; the OSP 998 may not have known about the fee; the OSP 998 may have known about the fee, but did not propose the fee to the seller 993; the fee may not have been promulgated yet; if the fee was promulgated later, the client 993 may not have learned about it; the OSP 998 may have learned about the fee, but did not notify its clients; the OSP may have tried to notify its affected clients about the fee, but did not recognize seller 993 would be affected and missed seller 993; and/or the OSP 998 may have managed to notify seller 993 about the fee, but seller 993 did not manage to take appropriate steps on their own to account for the new tax type.

In some instances, the seller 993 will want to pass that extra type of tax to the buyer 996 by adding it to the sales invoice for a transaction, but in other instances not. The seller 993 may not know about the extra tax type in advance and may only opt for calculating sales tax with the OSP 998. However, based on the dataset 935 that includes sales transaction data and domain rules (which may include tax jurisdiction specific rules), when such new rules are indeed promulgated by the tax authorities 980, the OSP 998 can suggest to the user 992 that the seller 993 should be collecting another type of tax/fees, which in this case is the E-Waste fee.

Thus, jurisdictions may pass new laws and the corresponding tax authorities 980 may as a result impose new tax types which then will be made available instantly to clients of the OSP 998 and the new tax will be calculated on the clients' transactions. The seller 993 thus does not have to waste computing resources being vigilant about tracking and storing new possible future types of taxes. Although the seller 993 may initially subscribe to the services of the OSP 998 just for sales tax computation, the user 992 need only click a button to capture a new tax type and the associated new tax will be automatically calculated on the seller's transactions to which the new tax type applies.

In embodiments, the seller 993 signs up for the services of the OSP 998 and the seller 993 configures its business profile which governs which taxes would be calculated by the OSP 998 on client's transactions. However, the seller 993 may be unaware of potential tax collection liabilities the seller 998 is already liable for at the time of configuring the business profile. In addition to this, new tax laws may come into the existence later at the time of transaction in the future. Thus, OSP 998 keeps researching new tax laws promulgated by the tax authorities 980 and their applicability and the tax engine 983 evaluates each transaction sent by the seller 993 against various parameters to determine the applicability of a new tax liability which is not yet known by the seller 993. The OSP 998 allows the seller 993 to opt for the determination of new tax liabilities as indicated by the special tax option selection 940 and provides automation of the associated setup required to calculate, collect, report and remit the new tax liability. Further details of particular use cases will now be described.

Operational examples and sample use cases are possible where the attribute of an entity in a dataset is any one of: the entity's name; type of entity; a physical location such as an address; a contact information element; transactions of the entity; an identifier of a specific source of revenue received for a transaction of the entity; characteristics of transactions of the entity; licensure and/or or registration of the entity and/or products or services the entity produces, sells, stores and/or transfers; products or services produced, sold, stored and/or transferred by the entity; types of products or services produced, sold, stored and/or transferred by the entity; a location to which products are sent, shipped or transferred; a location from which products are received; a location of a property owned by the entity; a location of a property owned by the entity within a particular region of other domain; an affiliation; a characterization of another entity; a characterization by another entity; an association or relationship with another entity (general or specific instances); an asset of the entity; a declaration by or on behalf of the entity; and so on. Different resources may be produced in such instances, and so on.

In particular, FIG. 9 is diagram for an operational example and use case where the resource 979 includes a tax obligation of a primary entity, such as seller of goods or services 993 and/or a secondary entity, such as buyer of goods or services 996, due to a transaction 997. It will be recognized that aspects of FIG. 9 have similarities with aspects of FIG. 1. Portions of such aspects may be implemented as described for analogous aspects of FIG. 1. In particular, a thick line 915 separates FIG. 9, although not completely or rigorously, into a top portion and a bottom portion. Above the line 915 the emphasis is mostly on entities, components, their relationships, and their interactions, while below it the emphasis is mostly processing of data that takes place often within one or more of the components above the line 915. Above the line 915, a computer system 995 is shown, which is used to help clients, such as a seller 993 and an associated user 992, with tax compliance. Further in this example, the computer system 995 is part of an OSP 998 that is implemented as a Software as a Service (SaaS) provider, for being accessed by the user 992 online. Alternately, the functionality of the computer system 995 may be provided locally to a user.

The user 992 may be standalone. The user 992 may use a computer system 990 that has a screen 991. In embodiments, the user 992 and the computer system 990 are considered part of the seller 993, which is also known as entity 993. The seller 993 can be a business, such as a seller of items, a reseller, and so on. The user 992 can be an employee, a contractor, or otherwise an agent of the entity 993. In use cases, the seller 993 and the buyer 996 are performing the buy-sell transaction 997. The transaction 997 will have data that is known to the seller 993, similarly with what was described by the relationship instance 197 of FIG. 1B.

In a number of instances, the user 992 and the seller 993 use software applications to manage their business activities, such as sales, resource management, production, inventory management, delivery, billing, and so on. The user 992 and/or the seller 993 may further use accounting applications to manage purchase orders, reservations, bookings, sales invoices, refunds, payroll, accounts payable, accounts receivable, and so on. Such software applications, and more, may be used locally by the user 992 or from an Online Processing Facility (OPF) 989 that has been engaged for this purpose by the user 992, and/or the seller. In such use cases, the OPF 989 can be a Mobile Payments system, a Point Of Sale (POS) system, an Accounting application, an Enterprise Resource Planning (ERP) provider, an e-commerce provider, an electronic marketplace, a Customer Relationship Management (CRM) system, and so on.

Businesses have tax obligations to various tax authorities of respective domains (e.g., respective tax jurisdictions). A first challenge is in making the related determinations. Tax-related determinations, made for the ultimate purpose of tax compliance, are challenging because the underlying statutes and tax rules and guidance issued by the tax authorities are very complex. There are various types of tax, such as sales tax, use tax, excise tax, value-added tax, lodging tax, and issues about cross-border taxation including customs and duties, and many more. Some types of tax are industry specific. Each type of tax has its own set of rules. Additionally, statutes, tax rules, and rates change often, and new tax rules are continuously added. Compliance becomes further complicated when a taxing authority, such as tax authority 981 or tax authority 982 promulgates new tax types of which the seller 993 is presently unaware.

Tax jurisdictions are defined mainly by geography. Businesses have tax obligations to various tax authorities within the respective tax jurisdictions. There are various tax authorities, such as that of a country, of a state, of a municipality, of a local district such as a local transit district and so on. So, for example, when a business sells items in transactions that can be taxed by a tax authority, the business may have the tax obligations to the tax authority. These obligations include requiring the business to: a) register itself with the tax authority's taxing agency, b) set up internal processes for collecting sales tax in accordance with the sales tax rules of the tax authority, c) maintain records of the sales transactions and of the collected sales tax in the event of a subsequent audit by the taxing agency, d) periodically prepare a form ("tax return") that includes an accurate determination of the amount of the money owed to the tax authority as sales tax because of the sales transactions, e) file the tax return with the tax authority by a deadline determined by the tax authority, and f) pay ("remit") that amount of money to the tax authority. In such cases, the filing and payment frequency and deadlines are determined by the tax authority.

A technical problem for businesses is that the above-mentioned software applications generally cannot provide tax information that is accurate and current enough for the businesses to be tax compliant with all the relevant tax authorities. The lack of accuracy may manifest itself as errors in the amounts determined to be owed as taxes to the various tax authorities, and it is plain not good to have such errors. For example, businesses that sell products and services have risks whether they over-estimate or under-estimate the sales tax due from a sale transaction. On the one hand, if a seller over-estimates the sales tax due, then the seller collects more sales tax from the buyers than was due. Of course, the seller may not keep this surplus sales tax, but instead must pay it to the tax authorities-if they cannot refund it to the buyers. If a buyer later learns that they paid unnecessarily more sales tax than was due, the seller risks at least harm to their reputation. Sometimes the buyer will have the option to ask the state for a refund of the excess tax by sending an explanation and the receipt, but that is often not done as it is too cumbersome. On the other hand, if a seller under-estimates the sales tax due, then the seller collects less sales tax from the buyers, and therefore pays less sales tax to the authorities than was actually due. That is an underpayment of sales tax that will likely be discovered later, if the tax authority audits the seller. Then the seller will be required to pay the difference, plus fines and/or late fees, because ignorance of the law is not an excuse. Further, one should note that sales taxes are considered trust-fund taxes, meaning that the management of a company can be held personally liable for the unpaid sales tax.

For sales in particular, making correct determinations for sales and use tax is even more difficult. There are a number of factors that contribute to its complexity.

First, some state and local tax authorities have origin-based tax rules, while others have destination-based tax rules. Accordingly, a sales tax may be charged from the seller's location or from the buyer's location.

Second, the various tax authorities assess different, i.e. non-uniform, percentage rates of the sales price as sales tax, for the purchase and sale of items that involve their various tax jurisdictions. These tax jurisdictions include various states, counties, cities, municipalities, special taxing jurisdictions, and so on. In fact, there are over 10,000 different tax jurisdictions in the US, with many partially overlapping.

Third, in some instances no sales tax is due at all because of the type of item sold. For example, in 2018 selling cowboy boots was exempt from sales tax in Texas, but not in New York. This non-uniformity gives rise to numerous individual taxability rules related to various products and services across different tax jurisdictions.

Fourth, in some instances no sales tax is due at all because of who the individual buyer is. For example, certain entities are exempt from paying sales tax on their purchases, so long as they properly create and sign an exemption certificate and give it to the seller for each purchase made. Entities that are entitled to such exemptions may include wholesalers, resellers, non-profit charities, educational institutions, etc. Of course, who can be exempt is not exactly the same in each tax jurisdiction. And, even when an entity is entitled to be exempt, different tax jurisdictions may have different requirements for the certificate of exemption to be issued and/or remain valid.

Fifth, it can be difficult to determine which tax authorities a seller owes sales tax to. A seller may start with tax jurisdictions that it has a physical presence in, such as a main office, a distribution center or warehouse, an employee working remotely, and so on. Such ties with a tax jurisdiction establish the so-called physical nexus. However, a tax authority such as a state or even a city may set its own nexus rules for when a business is considered to be "engaged in business" with it, and therefore that business is subject to registration and collection of sales taxes. These nexus rules may include different types of nexus, such as affiliate nexus, click-through nexus, cookie nexus, economic nexus with thresholds, and so on. For instance, due to economic nexus, a remote seller may owe sales tax for sales made in the jurisdiction that are a) above a set threshold volume, and/or b) above a set threshold number of sales transactions.

To help with such complex determinations and solve such technical problems, the computer system 995 may be specialized device for tax compliance as disclosed herein. The computer system 995 may have one or more processors and memory, for example, as was described for the computer system 195 of FIG. 1. The computer system 995 thus implements a tax engine 983 to make the determination of a first tax obligation for a dataset representing a transaction, provide a selectable special tax option to the client to additionally have the OSP 998 produce one or more additional tax obligations for the dataset according to a future digital tax rule, further produce the additional tax obligation based on applying the future digital rule (once known) to the dataset to produce a tax obligation component and based on adding the tax obligation component to the first tax obligation. The tax engine 983 can be as described for the service engine 183.

The computer system 995 may further store locally entity data, i.e. data of user 992, of entity 993, any of which/whom may be a customer, and/or a seller or a buyer in a sales transaction in various embodiments. The entity data may include profile data of the customer and transaction data from which a determination of a tax obligation is desired. In the online implementation of FIG. 9, the OSP 998 has a database 994 for storing the entity data. This entity data may be inputted by the user 992, and/or caused to be downloaded or uploaded by the user 992 from the computer system 990 or from the OPF 989, or extracted from the computer system 990 or from the OPF 989, and so on. In other implementations, a simpler memory configuration may suffice for storing the entity data.

A digital tax content 986 is further implemented within the OSP 998. The digital tax content 986 can be a utility that stores digital tax rules 970 for use by the tax engine 983. As part of managing the digital tax content 986, there may be continuous updates of the digital tax rules, by inputs gleaned from a set 980 of different tax authorities 981, 982, . . . . Updating may be performed by humans, or by computers, and so on. As mentioned above, the number of the different tax authorities in the set 980 may be very large and the future digital tax rules resulting from tax regulations promulgated by such tax authorities in the set 980, once recognized and stored by the OSP 998, may be used to compute such tax obligations based on a special tax obligation selection 940 received from the seller 993.

For a specific determination of a tax obligation, the computer system 995 may receive one or more datasets. A sample received dataset 935 is shown just below line 915, which can be similar to what was described for the dataset 135 of FIG. 1. In this example, the computer system 990 transmits a request 984 that includes a payload 934, and the dataset 935 is received by the computer system 995 parsing the received payload 934. In this example the single payload 934 encodes the entire dataset 935, but that is not required, as mentioned earlier. The computer system 990 may also transmit a special tax option selection 940 which indicates to the OSP 998 that the seller 993 has selected to additionally have the OSP 998 produce one or more additional tax obligations for the dataset according to a future digital tax rule. In an example embodiment, the future digital tax rule is not yet specified and not yet stored in memory by the OSP 998 at a time when the request 934 is received.

In this example, the dataset 935 has been received because it is desired to determine any tax obligations arising from the buy-sell transaction 997. As such, the sample received dataset 935 has values that characterize attributes of the buy-sell transaction 997, as indicated by an arrow 999. (It should be noted that the arrow 999 describes a correspondence, but not the journey of the data of the buy-sell transaction 997 in becoming the received dataset 935.) Accordingly, in this example the sample received dataset 935 has a value ID for an identity of the dataset 935 and/or the transaction 997. The dataset 935 also has a value PE for the name of the seller 993 or the user 992, which can be the seller 993 making sales transactions, some online. The dataset 935 further has a value PD for relevant data of the seller 993 or the user 992, such as an address, place(s) of business, prior nexus determinations with various tax jurisdictions, and so on. The dataset 935 also has a value SE for the name of the buyer 996. The dataset 935 further has a value SD for relevant data of the buyer 996, entity-driven exemption status, and so on. The dataset 935 has a value B2 for the sale price of the item sold.

The dataset 935 may fewer values or have additional values, as indicated by the dot-dot-dot in the dataset 935. These values may characterize further attributes, such as characteristics of the item being sold, data identifying of or otherwise relating to a license or registration required for the transaction, a date and possibly also time of the transaction 997, and so on.

The digital tax rules 970 have been created so as to accommodate tax rules that the set 980 of different tax authorities 981, 982 . . . promulgate within the boundaries of their tax jurisdictions. In FIG. 5, five sample digital tax rules are shown, namely T_RULE2 972, T_RULE3 973, T_RULE5 975, T_RULE6 976 and T_RULE7 977. Additional digital tax rules 970 are suggested by the vertical dot-dot-dots. Similarly with FIG. 1, some of these digital tax rules may be digital main rules that determine the tax obligation 979, while others can be digital precedence rules that determine which of the digital main rules is to be applied in the event of conflict. In some use cases, digital main tax rules may be about a sales tax or use tax being owed due to the transaction 997 at a certain percentage of the purchase price. Digital precedence rules may be digital tax rules that determine whether particular digital tax rules are to be applied for origin-based or destination-based jurisdictions, how to override for diverse taxability of individual items, for temporary tax holidays, for exemptions from having to pay sales tax based on who the buyer is, and also based on nexus, and so on. In the present example, digital precedence rules may be digital tax rules that determine whether particular digital tax rules are to be applied based on one or more tax jurisdictions associated with a transaction, such as transaction 997, and/or based on whether or not the seller has selected to additionally have the OSP 998 produce one or more additional tax obligations for the dataset according to a future digital tax rule.

Similarly with FIG. 1B, these digital tax rules 970 can be implemented or organized in different ways. In some use cases they can be organized with conditions and consequents, such as was described earlier in this document. Such conditions may relate to geographical boundaries, sources of revenue, effective dates, and so on, for determining where and when a digital tax rule or tax rate is to be applied. These conditions may be expressed as logical conditions with ranges, dates, other data, and so on. Values of the dataset 935 can be iteratively tested against these logical conditions according to arrows 971. In such cases, the consequents may indicate one or more tax obligations, such as to indicate different types of taxes that are due, rules, rates, exemption requirements, reporting requirements, remittance requirements, etc.

In this example, a certain digital tax rule T_RULE5 975 is shown as identified and used, which is indicated also by the beginning of an arrow 978. Identifying may be performed responsive to the values of the dataset 935, which are shown as considered for digital tax rules 970 by arrows 971. For example, it can be recognized that a condition of the digital tax rule T_RULE5 975 is met by one or more of the values of the dataset 935.

As such, the computer system 995 may produce the tax obligation 979 and tax return document, which is akin to producing the resource 179 of FIG. 1B. The computer system 995 may also file or otherwise send (or cause to be filed or sent) the tax return document to one or more of the applicable tax authorities in the set of tax authorities 980 via network 188. The tax obligation 979 can be produced by the computer system 995 applying the certain digital tax rule T_RULE5 975, as indicated by the arrow 978. In this example, the consequent of the identified certain digital tax rule T_RULE5 975 may specify that a sales tax is due for an item, the amount is to be determined by a multiplication of the sale price of the value B2 by a specific rate, the tax return form that needs to be prepared and filed, a date by which it needs to be filed, and so on.

The computer system 995 may then cause a notification 936 to be transmitted. The notification 936 can be about an aspect of the tax obligation 979, similarly with the notification 136 of FIG. 1. In the example of FIG. 9, the notification 936 is caused to be transmitted by the computer system 995 as an answer to the received dataset 935. The notification 936 can be about an aspect of the tax obligation 979. In particular, the notification 936 may inform about the aspect of the tax obligation 979, namely that it has been determined, where it can be found, what it is, or at least a portion or a statistic of its content, and so on.

The notification 936 can be transmitted to one of an output device and another device that can be the remote device, from which the dataset 935 was received. The output device may be the screen of a local user or a remote user. The notification 936 may thus cause a desired image to appear on the screen, such as within a Graphical User Interface (GUI) and so on. The other device may be a remote device, as in this example. In particular, the computer system 995 causes the notification 936 to be communicated by being encoded as a payload 937, which is carried by a response 987. The response 987 may be transmitted via the network 188 responsive to the received request 984. The response 987 may be transmitted to the computer system 990, or to OPF 989, and so on. As such, the other device can be the computer system 990, a device of the OPF 989, or the screen 991 of the user 992, and so on. In this example the single payload 937 encodes the entire notification 936, but that is not required, similarly with what is written above about encoding datasets in payloads. Along with the aspect of the tax obligation 979, it is advantageous to embed in the payload 937 the ID value, one or more values of the dataset 935 and/or one or more of the digital tax rules 970 used to compute the tax obligation 979. This will help the recipient correlate the response 987 to the request 984, and therefore match the received aspect of the tax obligation 979 as the answer to the received dataset 935.

The OSP 998 also enables seller 993 to additionally have the OSP 998 produce one or more additional tax obligations for the dataset 935 according to future digital tax rules. For example, the OSP 998 may initially receive a settings request from a seller for an electronic service of producing one or more resources for a dataset 935 that the seller will provide subsequently to the OSP 998 according to one or more first digital tax rules of digital tax rules 970 presently stored in a first memory of OSP 998, such as T_RULE5 975. The OSP 998 may also provide a first selectable special option to the seller 993 to additionally have the OSP 998 produce one or more additional tax obligations for the dataset 935 according to a future digital tax rule not yet stored in memory. For example, the future digital tax rule may be based on a new or different type of additional tax promulgated by one of tax authorities 980 in the future or that may become applicable in the future. The OSP 998 may receive a first input, such as special tax option selection 940 as part of request 984, indicating whether or not the seller 993 has selected the first special tax option. In some embodiments, this special tax option selection 940 may be received with, in conjunction with, or as part of the payload 934. In some embodiments, the request 184 may include the dataset 935. However, in the present embodiment, the special tax option selection 940 is received before the dataset 935. In various embodiments, the special tax option selection 940 may be received by the OSP 998 during or after the initial onboarding or subscription of the seller 993 to the services of the OSP 998.

In the present example embodiment, after receiving the special tax option selection 940, the OSP 998 then stores a second digital rule, such as digital rule T_RULE6 976 in a second memory. The OSP 998 then receives dataset 935. The OSP 998 produces a first tax obligation based on identifying and applying one or more first digital tax rules of digital tax rules 970, such as T_RULE5 975, to the dataset 935 indicated by beginning of arrow 978. If the special tax option selection 940 has been received, then the OSP 998 may recognize that the second digital rule, such as digital tax rule T_RULE6 976, is applicable to the dataset 935 as indicated by the beginning of line 979 and that the special tax option selection 940 indicates the second digital tax rule as the future digital tax rule. For example, the applicability of the second digital tax rule, such as digital rule T_RULE6 976, to the dataset 935 and that the second digital tax rule was not stored or specified at the time when the special tax option selection 940 was received indicates that the second digital tax rule is such a future digital rule as indicated by the special tax option selection 940. In some embodiments, the special tax option selection 940 having been received by the OSP 998 is a condition that must be met that is indicated by a digital precedence rule, such as T_RULE3 173, for rule T_RULE6 976 to be applied.

The OSP 998 then further produces a second tax obligation as tax obligation 979 based on applying the second digital tax rule, such as digital rule T_RULE6 976, to the dataset 935 as indicated by line 979 to produce a tax obligation component (e.g., an E-Waste fee) and based on adding the tax obligation component to the first tax obligation (e.g., a sales tax amount), as indicated by the end of arrow 978. The OSP 998 then transmits a response, such as notification 936, to the seller 993 regarding the second tax obligation (e.g., the total equaling the E-Waste fee added to sales tax) as the tax obligation 979. Else, if the special tax option selection 940 has not been received, then the OSP 998 does not produce the second tax obligation and instead transmits a response to the seller 993 regarding the first tax obligation as tax obligation 179.

In this manner, future digital tax rules that may not be in existence, not yet applicable, not yet accessible, are otherwise not yet specified and/or have not yet been stored by the OSP 998 may be automatically applied to datasets representing transactions of sellers, such as seller 993, avoiding the seller 993 and OSP 998 having to request such future digital tax rules to be applied each time they are saved or updated by the OSP 998 and avoiding the seller 993 and OSP 998 having to go back and revise previously produced tax obligations based on future digital tax rules, which improves computerized networks by more efficiently using computing and network resources to increase the accuracy and speed of the networked computing system.

Figure 10:
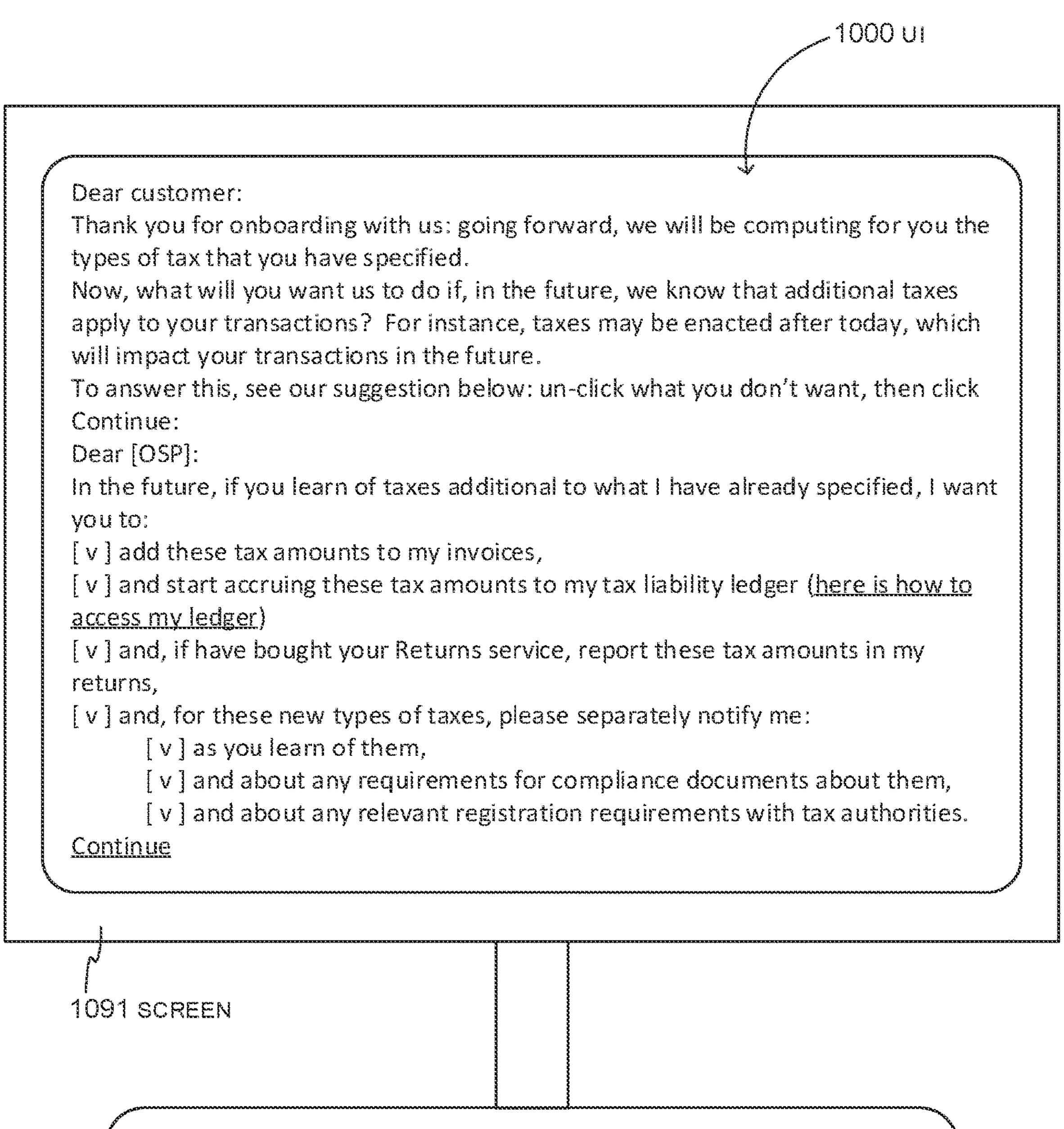
FIG. 10 is a sample view of a User Interface (UI) in which various options are presented for a client to enable FUTREP, according to embodiments of the present disclosure, which is an improvement in automated computerized systems.

FIG. 10 is a sample view of a User Interface (UI) 1000 in which various options are presented for a client to enable FUTREP, according to embodiments of the present disclosure, which is an improvement in automated computerized systems. Shown is UI 1000 presented on a screen 1091 of a device. For example, the screen 1091 may be screen 991 of the computer system 990 or other device of the seller 993 or user 992. Shown in UI 1000 are a plurality of selectable options that the user 992 may select to indicate to the OSP 998 what to do if, in the future, the OSP 998 knows that additional taxes apply to transactions of the seller 993. For instance, taxes may be enacted after onboarding of the seller 993 to the services of the OSP 998, which will impact transactions of the seller 993 in the future. Also provided is a selectable user interface element that the user 992 may select to indicate to the OSP 998 how to access the ledger of the seller 993 such that the OSP 998 may start accruing the additional tax amounts to the tax liability ledger of the seller 993, should the user 992 select the option to do so.

Figure 11:
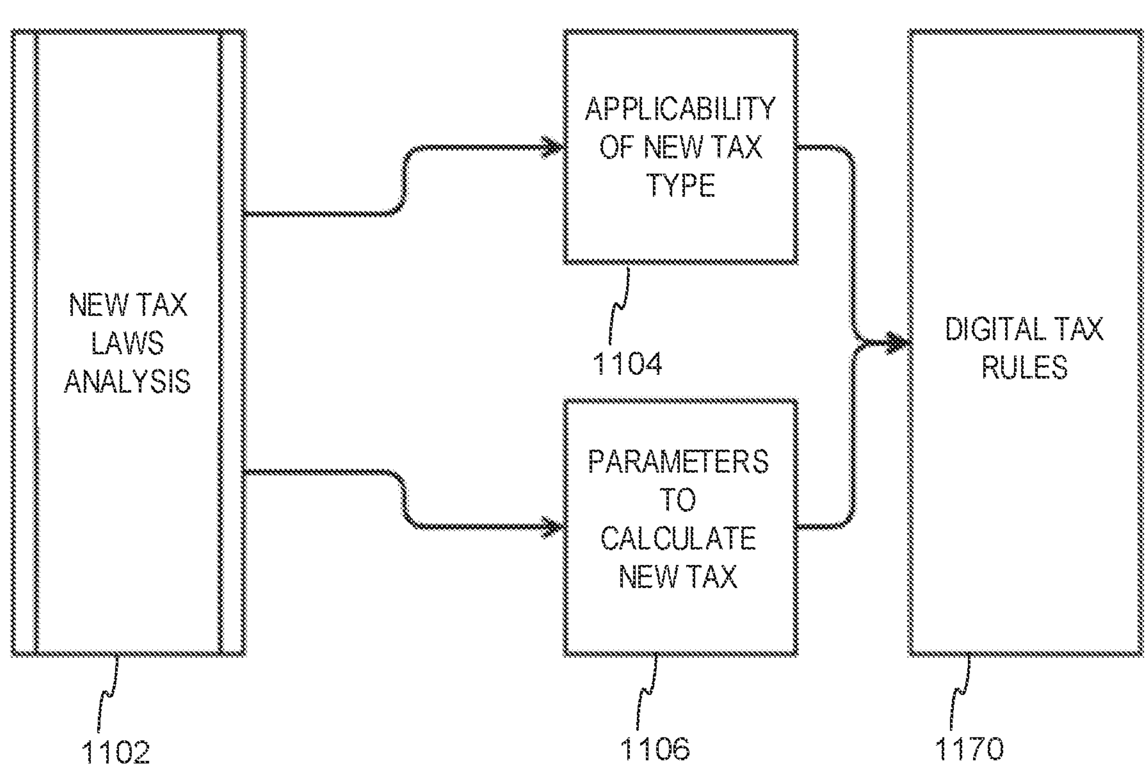
FIG. 11 is a diagram showing sample aspects of embodiments of the present disclosure involving dynamic evaluation and updating of stored digital rules, according to embodiments of the present disclosure, which is an improvement in automated computerized systems.

FIG. 11 is a diagram showing sample aspects of embodiments of the present disclosure involving dynamic evaluation and updating of stored digital tax rules, according to embodiments of the present disclosure, which is an improvement in automated computerized systems. As illustrated in FIG. 11, as new a tax is enacted and analyzed by the OSP 998, represented by new tax laws analysis 1102, and/or new applicability criteria indicating the applicability of a new tax type 1104 comes into existence, or new jurisdictions are formed, the OSP 998 creates digital tax 1170 rules and associates them with various parameters to calculate new tax 1106. The OSP 998 may continuously and automatically update the set of parameters to calculate the new tax 1106 based on the research of the OSP 998 and new tax laws analysis 1102. In other embodiments, the new tax laws analysis 1102 may be manually performed and the OSP 998 update the set of parameters to calculate the new tax 1106 based on manual performance of the new tax laws analysis 1102.

Figure 12:
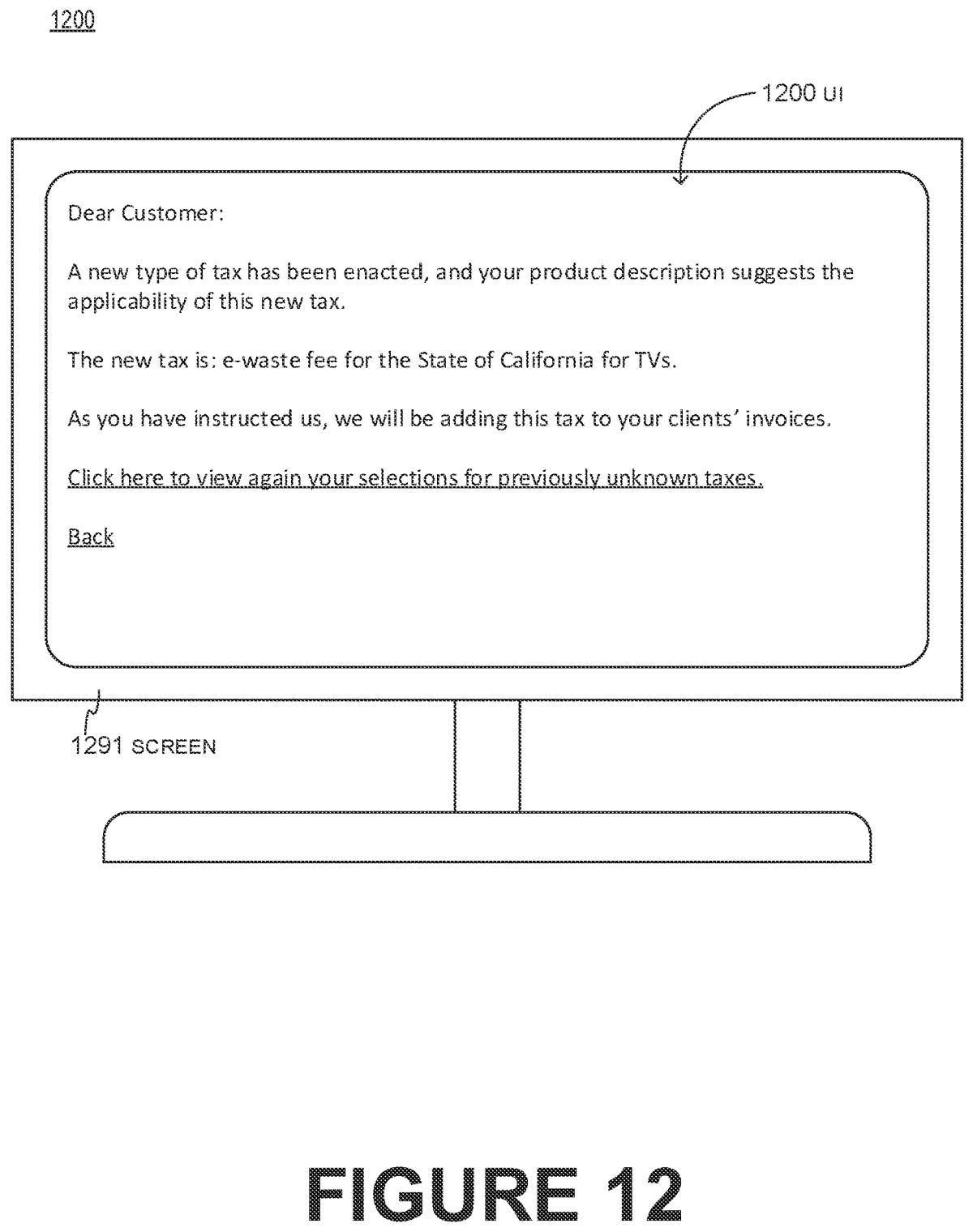

FIG. 12 is a sample view of a User Interface (UI) 1200 of a system in which FUTREP has been enabled and a notification is presented accordingly to the seller 993 regarding applicability to a transaction of a new type of tax that has been enacted based on selections of the seller 993 for previously unknown taxes, according to embodiments of the present disclosure, which is an improvement in automated computerized systems. In the present case, the seller 993 has selected to additionally have the OSP 998 produce one or more additional tax obligations for datasets according to future digital tax rules, for example, by selecting the option shown in the UI 1000 of FIG. 10 to add such tax obligations to invoices of the client 993 and selecting the notification option of the UI 1000 of FIG. 10 to separately notify the user 992 as the OSP 998 learns of such new applicable tax types. In the present example, the OSP 998 has learned of a new applicable tax type (e.g., an E-Waste fee for the State of California for TVs) and the user 992 is thus notified via the UI 1200 of the new tax type according to the selections made in UI 1000 of FIG. 10. A selectable option in also presented in UI 1200 that the user may select to view again their selections for previously unknown taxes. For example, the selection of such an option may cause the UI 1000 of FIG. 10 to be presented again.

Figure 13:
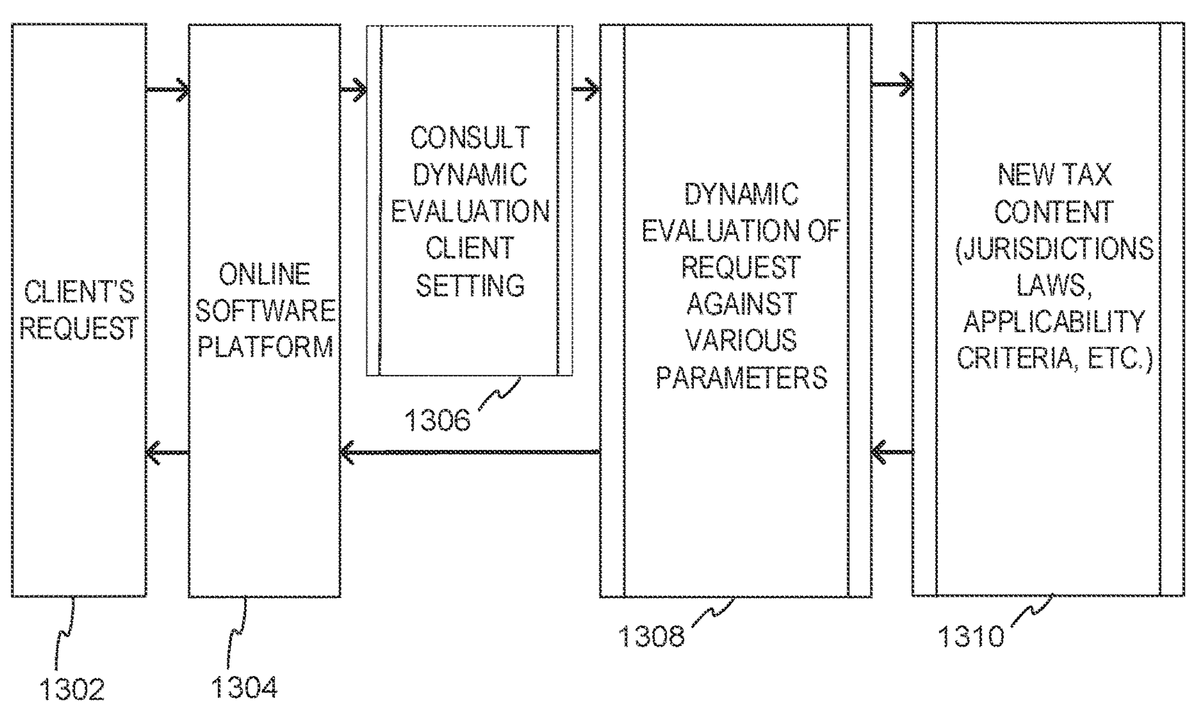
FIG. 13 is a diagram showing sample aspects of embodiments of the present disclosure involving the OSP consulting client FUTREP settings to evaluate a sale against a number of parameters, and thus decide if the client is liable for additional tax collection and then notifying the client, according to embodiments of the present disclosure, which is an improvement in automated computerized systems.

FIG. 13 is a diagram showing sample aspects of embodiments of the present disclosure involving the OSP 1304 consulting client FUTREP settings to evaluate a sale against a number of parameters, and thus decide if the client 993 is liable for additional tax collection and then notifying the client, according to embodiments of the present disclosure, which is an improvement in automated computerized systems. In the present example, OSP 1304 is an example of OSP 998 of FIG. 9. As the client 998 sends new sales data via the client's request 1302 to the OSP 1304, the OSP 1304 consults a dynamic evaluation setting 1306 of the client 993 to determine whether dynamic evaluation of the applicability of new tax content (e.g., future digital tax rules) has been selected by the client 993. If the dynamic evaluation setting has been selected, then dynamic evaluation of the request against various parameters 1308 is performed by matching the new tax content 1310 based on the various parameters. For example, the various parameters may include parameters regarding tax jurisdictions, tax laws, tax law applicability criteria, etc. The results of the dynamic evaluation of the request against various parameters 1308 is then communicated in response to the client's request 1302 via the OSP 1304, such as by the OSP 1304 sending notifications to the client.

The OSP 1304 allows the client to opt in to determine new liabilities and receive notifications. This assures the client to be always in tax compliance without the need to revisit the compliance system provided by the OSP 1304 and re-configuring it. Based on the client's request data, the OSP 1304 can evaluate a sale against a number of parameters, and thus decide if client is liable for additional tax collection.

In some embodiments, the client's request 1302 and the response from the OSP 1304 may be made via API calls. Configuration of the API response can be such that: additional parameters sent back due to discovered new digital rules will not be ignored or misunderstood as errors. Such configuring can be, for example, from the SDK implemented by the client or otherwise. The earlier configuring can provide such additional space, both in the API call and in the API response. Such additional parameters can include: computation of additional tax amount(s), name for additional tax amount(s) and total (if chosen) of all tax amounts. Configuring can provide such additional space in the API response, and thus such space for more parameters may be utilized. Generally, the field on invoices may be called "Total Tax" and that is where the total tax obligation may be presented. Various types of tax obligations may be summed into this field. Additionally, some ERPs may have a dedicated sales tax label that the OSP 1304 may use to create a new line item with its own description (e.g. "Excise tax for tanning products" or "E-Waste fee") for the additional tax obligation computed based on future digital tax rules. In various embodiments, the generated invoice may include one or more of: an exact amount of an additional tax obligation, the name of an additional tax obligation, and a total of sales tax plus the additional tax obligation.

Generally, the OSP 1304 further allows the client to configure how to process the new tax liability for a new tax type based on applying one or more future digital tax rules to a transaction of the client and how to report the new tax liability. In adding a new tax to the invoice of the client, the OSP 1304 further allows the client to configure how to process a new tax type determined by the OSP 1304 in real time as the transaction is occurring. In particular, the OSP 1304 allows the user 992 to pre-configure whether or not to add a new tax to the invoice when it determines the applicability of a new tax type which was unknown at the time of business profile configuration by client. Alternatively, the OSP 1304 asks the user for accepting new tax at the time of transaction, if it was not pre-configured whether or not to add a new tax to the invoice.

If client opted "Yes" for adding new tax to the invoice, the OSP 1304 adds the new tax liability to the invoice. If client opted "No" for adding the new tax liability to the invoice, the OSP 1304 does not add it to the invoice, however, the OSP 1304 may mark the transaction as candidate for new tax in database 994 and then allow the user 992 to retroactively calculate and generate an additional tax liability report anytime in future. The OSP 1304 allows the client to opt for returning the new tax liability either as a separate line item on the sales invoice or add it to total tax amount of the sales invoice.

Figure 14:
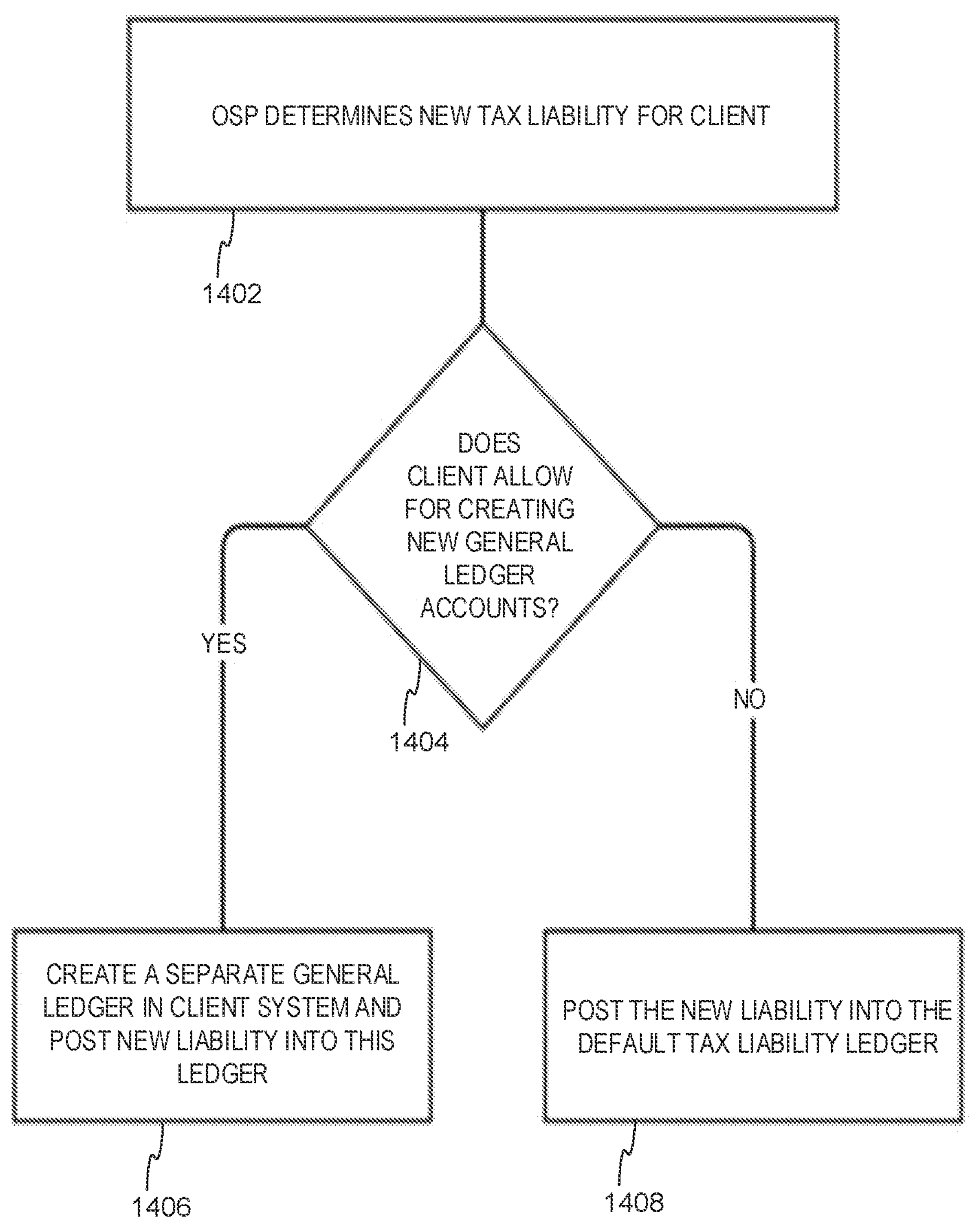
FIG. 14 is a diagram showing sample aspects of embodiments of the present disclosure in which the OSP consults client FUTREP settings to process a new tax type and post a corresponding new tax liability to the client's account, according to embodiments of the present disclosure, which is an improvement in automated computerized systems.

FIG. 14 is a diagram showing a method 1400 in which the OSP, such as the OSP 998 of FIG. 9, consults client FUTREP settings to process a new tax type and post a corresponding new tax liability to the client's account, according to embodiments of the present disclosure, which is an improvement in automated computerized systems. The OSP 998 will either post this new tax liability into a separate general ledger account created in client the system by the OSP 998 in real time as the transaction is occurring or it will post this new tax liability into a catch all tax ledger account based on the client system configurations.

For example, at 1402 the OSP 998 determines the new tax liability;

At 1404, the OSP 998 determines whether the client allows for creating new general ledger accounts. If it is determined that the client allows for creating new general ledger accounts, the method 1400 proceeds to 1406. If it is determined that the client does not allow for creating new general ledger accounts, the method 1400 proceeds to 1408.

At 1406, the OSP 998 creates a separate general ledger in the client system and posts the new tax liability into this ledger.

At 1408, the OSP 998 posts the new tax liability into the default tax liability ledger.

The embodiments described above may also use synchronous or asynchronous client-server computing techniques, including software as a service (SaaS) techniques. However, the various components may be implemented using more monolithic programming techniques as well, for example, as an executable running on a single CPU computer system, or alternatively decomposed using a variety of structuring techniques known in the art, including but not limited to, multiprogramming, multithreading, client-server, or peer-to-peer, running on one or more computer systems each having one or more CPUs. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the functions of the systems and methods described herein.

In addition, programming interfaces to the data stored as part of the system controller 210 and other system components described herein may be available by mechanisms such as through C, C++, C#, and Java APIs; libraries for accessing files, databases, or other data repositories; through scripting languages such as JavaScript and VBScript; or through Web servers, FTP servers, or other types of servers providing access to stored data. The databases described herein and other system components may be implemented by using one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the embodiments in a distributed manner including but not limited to TCP/IP sockets, RPC, RMI, HTTP, Web Services (XML-RPC, JAX-RPC, SOAP, and the like). Other variations are possible. Also, other functionality may be provided by each component/module, or existing functionality could be distributed amongst the components/modules in different ways, yet still achieve the functions described herein.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system including at least:

one or more processors; and a non-transitory computer-readable storage medium having stored thereon instructions which, when executed by the one or more processors, result in operations including at least:

receiving a settings request at an online software platform (OSP) from a client for an electronic service of producing one or more resources for a dataset that the client will provide subsequently to the OSP, the dataset representing a relationship instance of the client with a secondary entity, the relationship instance being associated with one or more domains, the one or more resources to be produced according to one or more first digital rules presently stored in a first memory;

providing a first selectable special option to the client to additionally have the OSP produce one or more additional resources for the dataset according to a future digital rule, in which the future digital rule is based on a future rule that is generated by and received from a source external to and remote from the client and the OSP;

receiving first input indicating whether or not the client has selected the first special option, in which the future digital rule is not yet specified and not yet stored in a second memory at a time when the first input is received;

receiving a second digital rule;

storing the second digital rule in the second memory;

then receiving the dataset from the client;

producing a first resource based on applying the one or more first digital rules to the dataset; and if the first special option has been selected, then:

recognizing that the second digital rule is applicable to the dataset;

recognizing that the selected first special option indicates the second digital rule as the future digital rule;

further producing a second resource based on applying the second digital rule to the dataset to produce a resource component and based on adding the resource component to the first resource; and transmitting a response to the client regarding the second resource, else if the first special option has not been selected, then:

not producing the second resource; and transmitting a response to the client regarding the first resource.

2. The computer system of claim 1 in which the instructions, when executed by the one or more processors, further result in operations including:

receiving from the client an earlier dataset prior to storing the second digital rule in the second memory;

producing an earlier resource based on applying the one or more first digital rules to the earlier dataset;

responsive to the first special option having been selected, recognizing that the selected first special option does not indicate any rule as the future digital rule; and transmitting an earlier response to the client regarding the earlier resource.

3. The computer system of claim 1 in which the first memory is the second memory.

4. The computer system of claim 1 in which the second digital rule is stored in the second memory by the OSP.

5. The computer system of claim 1 in which:

the settings request identifies an item, the relationship instance is about the item, and the instructions, when executed by the one or more processors, further result in operations including:

selecting the one or more first digital rules and the second digital rule as applicable to the dataset also based on the item.

6. The computer system of claim 1 in which the instructions, when executed by the one or more processors, further result in operations including:

providing a second selectable special option to the client to additionally have the OSP produce one or more additional resource components for the dataset by applying to the dataset a presently applicable digital rule that has become applicable to an item associated with the relationship instance since the request was received; and receiving second input indicating whether or not the client has selected the second special option, and in which the second resource is produced based on the second input.

7. The computer system of claim 1 in which the instructions, when executed by the one or more processors, further result in operations including:

in response to the storing the second digital rule, searching for items to which the second digital rule applies;

as a result of the search, identifying clients associated with respective ones of the items and that have requested the OSP to produce respective resources for datasets of the clients;

of the identified clients, determining which have selected, prior to storing the second digital rule, the first special option;

for each of the determined clients, pre-associating the second digital rule with the respective item to which the second digital rule applies;

receiving datasets from one or more of the determined clients representing respective relationship instances of the determined clients with one or more respective secondary entities; and producing additional resources according to the first special option for one or more of the datasets received from the determined clients based on the pre-association.

8. The computer system of claim 7 in which the identifying clients associated with respective ones of the items includes:

determining that a particular client is associated with a respective item based on the respective item being a subject of one or more relationship instances represented by one or more datasets previously received from the particular client.

9. The computer system of claim 7 in which the identifying clients associated with respective ones of the items includes:

determining that a particular client is associated with a respective item based on the particular client declaring to the OSP that the respective item is associated with relationship instances of the particular client.

10. The computer system of claim 7 in which the instructions, when executed by the one or more processors, further result in operations including:

in response to the identifying clients, for each identified client, transmitting a notification to the identified client that the identified client is associated with the respective item to which the second digital rule applies;

in conjunction with transmitting the respective notifications, providing a second selectable special option to the identified clients to additionally have the OSP produce one or more additional resource components according to the second digital rule, for respective datasets that were received from the identified clients previous to the storing the second digital rule;

receiving second input indicating acceptance of the second selectable special option from one or more of the identified clients;

based on the acceptance, producing one or more additional resource components, according to the second digital rule, for respective datasets that were received from the one or more identified clients previous to the storing the second digital rule; and for each of the one or more of the identified clients:

producing a respective additional resource, based on the additional resource components, for a respective dataset that was received from the client previous to the storing the second digital rule; and transmitting a respective response regarding the respective additional resource to the client.

* * * * *